United States Patent
Kahn

(10) Patent No.: US 7,185,192 B1
(45) Date of Patent: Feb. 27, 2007

(54) METHODS AND APPARATUS FOR CONTROLLING ACCESS TO A RESOURCE

(75) Inventor: Clifford E. Kahn, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 887 days.

(21) Appl. No.: 09/611,913

(22) Filed: Jul. 7, 2000

(51) Int. Cl.
*H04L 9/00* (2006.01)
*G06F 7/00* (2006.01)

(52) U.S. Cl. .................. 713/155; 713/167; 726/27; 726/17; 707/102; 707/9; 707/3; 707/101

(58) Field of Classification Search ............... 713/155, 713/200, 201, 211, 154, 166; 707/10, 9, 707/3, 102; 709/229
See application file for complete search history.

(56) References Cited

U.S. PATENT DOCUMENTS

| | | | |
|---|---|---|---|
| 4,754,410 A * | 6/1988 | Leech et al. ................. 706/45 |
| 5,968,176 A * | 10/1999 | Nessett et al. ............... 713/201 |
| 6,236,996 B1 * | 5/2001 | Bapat et al. .................... 707/9 |
| 6,298,340 B1 * | 10/2001 | Calvignac et al. ............. 707/3 |
| 6,385,598 B1 * | 5/2002 | Giacalone et al. ............. 706/1 |
| 6,408,336 B1 * | 6/2002 | Schneider et al. ........... 709/229 |
| 6,460,141 B1 * | 10/2002 | Olden ........................ 713/201 |
| 6,473,763 B1 * | 10/2002 | Corl et al. .................... 707/101 |
| 6,502,093 B1 * | 12/2002 | Bhatt et al. .................... 707/3 |
| 6,539,394 B1 * | 3/2003 | Calvignac et al. ............ 707/102 |
| 2004/0158744 A1 * | 8/2004 | Deng et al. .................. 713/201 |

OTHER PUBLICATIONS http://www.freenic.net/rfcs/rfc1400/rfc1457.html, FreeNIC.NET, Network Information Center, R. Housley, May 1993, 13 pages.
A User-Centered, Modular Authorization Service Built on an RBAC Foundation, Zurko, et al., 14 pages.
Netegrity™, Secure User Management for Intranet and Extranet Web Sites, Netegrity White Paper, Jan. 1999, Revision: Jan. 21, 1999, 31 pages.
Securant Technologies; Understanding ClearTrust for the Businessperson; http://www.securant.com/products/bus_focus/index.html; Jan. 10, 2001; 1 page.

(Continued)

*Primary Examiner*—Nasser Moazzami
*Assistant Examiner*—Carl G. Colin
(74) *Attorney, Agent, or Firm*—Chapin IP Law, LLC; Barry W. Chapin, Esq.

(57) ABSTRACT

An input/output interface receives an access request from a requester. A processor associated with the input/output interface applies a filter operation to select a subset of rules from a master set of rules maintained within an authorization database. Rules can be selected in this manner using filter operations so that all rules in the rule set need not be processed. A rule may include a disregard instruction. The processor further performs at least one rule operation based on the subset of rules to produce an access control decision in the memory system until either a rule operation including a disregard instruction is performed to limit performance of rule operations in the selected set of rules or until all rule operations in the selected set of rules that are applicable to the access control decision are performed.

30 Claims, 7 Drawing Sheets

OTHER PUBLICATIONS

Securant Technologies; Pillar One Access Control; http://www.securant.com/products/tech_focus/thetech/8pil/acc_cont.html; Jan. 10, 2001; 1 page.

Securant Technologies; For the Engineer Frequently Asked Questions; http://www.securant.com/products/tech_focus/tech_faq.html; Jan. 10, 2001; 8 pages.

* cited by examiner

METHODS AND APPARATUS FOR CONTROLLING ACCESS TO A RESOURCE

FIELD OF THE INVENTION

The present invention generally relates to access control systems, and more particularly, to systems and techniques which provide enhanced access control to resources in a computing system environment.

BACKGROUND OF THE INVENTION

The widespread use of computer systems, especially within networked computing environments, has created many different classes of computer users and has created a need for access control systems to govern how users can access such computer systems. As an example, consider a local area network (LAN) computing environment such as a corporate computer network, commonly referred as an intranet. The intranet network may include various computing systems such as intranet file servers, intranet web-servers, departmental computer systems, database servers, and so forth. Each computing system allows users and/or software programs to create and maintain directories, files, databases, or the like within data storage systems such as one or more disk drives coupled to the computing systems. The storage systems may contain varying amounts and types of data. Various users may control and access the different computing systems at different times of the day or night.

In such a computing environment, access control is an important aspect of system design and provides controlled access to files or other resources within the computing systems. Most conventional computing systems operate using an operating system that provides certain basic access control mechanisms. Using such conventional access control mechanisms, a computer systems manager or administrator (a person responsible for maintaining the computer systems) can configure, for example, an operating system such as Unix in a computer system to control how that computer system allows users to access various directories and files maintained under control of the operating system.

In an operating system such as Unix, access control is frequently provided via access control lists (ACLs) and/or by file and directory permission settings. ACLs are lists of users with associated permissions (e.g., read, write) that a systems manager can create and associate with a file and/or a directory in a filesystem. For instance, an ACL might list all users for a file that have read access to the file, write access to the file, and execute access to the file. When a user requests access to a particular file, the operating system checks the ACL associated with that file to determine if the user requesting access is listed for the type of access that is requested (e.g., read, write or execute). If the user is listed for the requested access, the operating system allows the requested access. Otherwise, a protection violation occurs and the operating system denies user access as requested.

Permission settings provide a condensed version of access control as compared to ACLs. In permissions settings within the Unix operating system, for example, there are three classifications of computer system users: "users", "groups" and everyone else who is considered, for access control purposes, in a "world" classification. The operating system associates an owner to each file (or directory). The owner is the "user" who creates or originates creation of that file. In addition, the user may belong to a "group" of users who share the file and who each need similar access to the file. All other users who attempt to access the file are in the general "world" classification. The operating system can also associate a set of permissions with each file or directory which specify, for each of the three user classifications (user, group, world), any read "r", write "w", and/or execute "x" privileges for that respective classification of users. The Unix operating system maintains the appropriate permission for each user classification as a collection of bits. In a single set of permissions for a file or directory, there are three fields (one for user, one for group and one for world) of three bits each (one for read, one for write and one for execute). The operating system might express such a set of permissions as "rwx,rwx,rwx" where the first "rwx" represents the permissions to that file or directory for a specific user identity, and where the second "rwx" represents the permissions to that file or directory for a group identity, and where the third "rwx" represents the permissions to that file or directory for all other users. For a particular file or directory, the user (i.e., the owner of that file or directory) or a systems manager can set each "r" "w" or "x" bit for each of the three user classifications to a value of one ("1") if access for that user classification is allowed for that desired access operation (read, write or execute), or to zero ("0") if access for that user classification is not allowed for the desired access operation. In this manner, the operating system requires nine bits per file or directory to record protection and access control information.

When a user logs onto a computer system running an operating system such as Unix, the operating system provides a unique pre-assigned numerical user identification number (uid or user identity) and group identification number (gid or group identity) to that user. Generally, programs subsequently created by that user inherit that user's user and group identities. When a such a program is executed as a process which attempts access to a certain file or directory, the operating system uses the user and group identities associated with the process to perform access control checks using the ACL and/or permission settings associated with files and/or directories.

As a specific example, a permission setting for a file of "110,100,000" allows the Unix operating system to grant read and write access to user and user processes having the user identity (i.e., the user or owner) associated with that file, but disallows execute access. In this example, the operating system might deny execute access since the file might be data rather that an executable program. This permission setting allows the operating system to grant read access to users and user processes that have a group identity that is the same as the group identity associated with the file, but disallows write or execute access for users or user processes that have group identities within the group associated with the file. Finally, this permission setting disallows read, write and execute access to all other users or user processes within the computer system which attempt to access the file in any manner. This example set of permissions thus provides a rather secure level of access to the file since the operating system provides only the user who owns the file (or user processes created by that user) the ability to read and write to the file, and only members of the group associated with the file (or processes that they create) are provided with read-only access to the file.

While not specifically related to the access control mechanisms explained above, certain software applications use rule processing techniques to direct data to various locations. As an example, Microsoft Outlook email processing software, manufactured by Microsoft Corporation of Redmond Wash., provides an email client program that can use rule processing to direct the placement of email messages within a user's various mailbox folders. A rule mechanism is provided to allow a user to establish rules that can, for instance, select an incoming email message, based on a source address, and deposit that message into a specific mailbox folder. Rule applicability can be conditioned on things such as specific words that might appear in an email message, or on destination or source email addresses. A user may also specify exceptions that define criteria for not applying a rule to routing of email messages. Rules in this system can also specify an action to be taken on the email message, such as, for example, deleting the email and to stop processing other rules once the rule is complete.

SUMMARY OF THE INVENTION

Conventional computer system access control mechanisms and authorization systems such as those noted above suffer from a variety of shortcomings. For example, ACLs can become quite long. It can be a burdensome task for a systems manager or user to maintain many different ACLs in separate ACL files for many different users, files or directories. Since the operating system maintains each ACL as a separate file, properly setting up a user with the correct permissions for each file can be quite prone to error. Accidentally providing an incorrect permission (e.g., read access) to a user might be a costly mistake.

While conventional access control mechanisms such as permission settings provide some flexibility to grant or deny access to certain users or processes and not to others, this blanket-style access control approach can be limiting or problematic in many situations. For example, when a user logs into a computer system and begins execution of a database process, this database process generally will execute "under" (i.e., using) the user identity of the user that created the database process (as discussed above). Such systems are thus hierarchical in nature in that a file, directory and/or a process hierarchically inherits a set of permissions associated with its creator irrespective of where the data is placed or who is accessing (e.g., executing or reading) the data. Thus, if a user logs into a computer systems and creates a series of directories and sub-directories and files within those directories and sub-directories, the permissions associated with those files, directories and sub-directories will be inherited based on the permissions associated with that user. There is little or no regard given to where those files, directories and sub-directories are stored (e.g., upon which disk or volume in a data storage system) or to what purpose of the data, directories or programs serve.

As another example of a problem of conventional access control mechanisms, consider a computer system with thousands or millions of resources (e.g., files) that require access control. Conceptually, a site security administrator might have a policy in mind about who (e.g., what users) should be able to access what resources (e.g., files, directories) in what manner(s) (e.g., read and/or write and/or execute). To realize, implement and/or actually enforce such a policy, the site security administrator might establish owner-group-world permission settings or ACL lists for each resource. This task would be quite cumbersome. Some computer system assist in this task by assigning a set of permission settings to new files created by a user that are equivalent to the creators current default permission settings. In other words, if a user creates a new file or directory, the operating system can assign that user's default permissions to that new file or directory. This is referred to as inheritance.

While inheritance allows an operating system to assign certain permission settings in an automated manner, the security administrator must still create group files and ACL lists for shared resources. It can quickly become difficult for the administrator to properly maintain the correct permission settings, ACL lists and group membership lists to properly reflect the intended security policies. Furthermore, once permissions and ACL lists are created with the intent of reflecting a security policy, there are few reliable ways to test and enforce the policy and if the policy requirement change, the permissions and ACL lists must be properly updated. Further still, many security policies attempt to embody or capture policy concerns that have characteristics related to physical, organizational and/or functional attributes of resources, users or other entities in a computing environment. In such cases, it may be very difficult to express such policy concerns using conventional access control techniques.

The present invention significantly overcomes many of the aforementioned drawbacks of conventional authorization and access control mechanisms. The system of this invention provides a flexible authorization system providing robust access control to resources in a computing system environment. The authorization system is typically embodied within a computer system configured to provide access control to one or more resources such as data or portions of a data storage system, though access control to any resource can be provided by this invention.

Generally, access control is provided in the invention using rule set processing. An access control administrator can create and store rules according to this invention in a master set of rules. Upon receipt of an access request requesting a type of access by a requestor to a resource, the system of the invention processes one or more filter operations that relate to one or more portions of information in the access request (e.g., that relate to the requestor submitting the access request, and/or to a type of access requested, and/or to the resource to which access is requested) to determine which rules from the master set of rules might apply to an access control decision (or a query request) based on the access request. Once the filter operations are complete, a selected set of rules is produced that define rule operations that when processed will grant certain access to certain requestors to the requested resource.

During the creation of rules, the administrator of access control can create rule operations based on conditions defined by relations or the rules may be unconditional or a combination of conditional and unconditional. Once the system of the invention determines the selected set of rules, the system then sequentially processes rule operations from the first rule that applies (based on the filter operations) to the last. If a rule contains a disregard instruction, rule processing can be further altered. A disregard instruction may cause rule processing to complete and not continue on to other rules that were determined to apply based on the filter operations. Alternatively, a disregard instruction can cause rule processing to be further limited to only processing certain rules or selected rule operations within the remainder of the unprocessed selected set of rules. In this manner, a rule set creator can create rules which halt the granting of permissions (i.e., enabling of access) in all circumstances or which limit further rule applications to certain conditions or circumstances. Thus, if a rule grants certain permissions to a certain requester and includes a disregard instruction, the rule set creator can thus be assured that if the system selects this rule (i.e., is included in the selected set of rules by the processing of the invention) based on filter operation processing, when the system processes the selected rule (i.e., its rule operations), the disregard instruction will either halt all further rule operation processing or will limit such processing to compliance with certain "disregard conditions". If a disregard instruction halts rule processing outright, this enables a rule set creator to position the rule including such a halt disregard instruction ahead or behind other rules in the rule set and if multiple rules appear to apply to an access control decision based on the filter operations, the first rule containing the disregard instruction will cut-off further rule processing.

If the disregard instruction is conditional, then it might cause further rule processing to disregard (i.e., to not process) certain rule operations, while allowing other remaining rule operations in the selected set of rule (initially selected by the filter operation(s)) to be processed. As an example, a disregard instruction might instruct a rule engine (to be explained) that performs rule processing to disregard any further rule operations relating to payroll data. As rule processing continues, the rule engine would thus not process rule operations in other rules within the selected set of rules that have an effect on payroll data.

Relations defining one or more conditions can also be used within rule operations themselves. For example, a relation might precede a disregard instruction, thus allowing conditional rule set processing. For example, if a requestor (e.g., a user requesting access to some data or other resource) were a staff employee, a disregard instruction preceded by a condition might state that if the requestor is in the staff department, then disregard all rules (or rule operations) that relate to granting permissions to payroll data. This conditional disregard instruction might be useful to limit staff employee access to payroll data. Since rule operations (including disregard instructions) can be general in nature, as in these and other examples provided herein, the access control system of the invention allow a security administrator to more generally express a security policy as a set of rules which can be applied system wide. Since the rules are a more concise representation of an access control policy than are a large set of ACLs and/or permissions settings for resources, the invention makes the security administrators job of setting up access control easier and makes verification of the security policy more straightforward.

Using the rule set structure and processing defined by the invention, a rule set creator can essentially program an access control scheme using careful rule creation and positioning of rules within the rule set. Since rules can include disregard instructions, processing may perform less than all rule operations from the selected set of rules. In some embodiments, this allows an administrator to create a rule hierarchy which can result in processing only a subset of rule operations from the selected set of rules that appear to be applicable to the access control decision based on one or more initially applied filter operations. Since rules can contain nested or deeper conditions than those tested by the filter operations, the system allows an administrator to create rules that can define unique roles, types of access and permissions to precisely control access to a resource. In other words, filter operations can be used to filter out a high level set of rules based on some criteria, while conditions and disregard instructions can be placed within rules themselves to further define and "filter" the granularity of access control (i.e., the granting or denial of permissions to a resource) provided by rule processing. Administrators can thus create tiered access control schemes the first select some rule based on certain factors (via filter operations), and then during application of those rules, can selectively (i.e., conditionally, using relations and disregard instructions) further clarify the granting or denial of permissions to resources for requesters.

More specifically, in one embodiment, the present invention provides a method for providing access control in a computing system environment. The method comprises the steps of receiving an access request and selecting, based on the access request, a selected set of rules containing at least one rule from at least one master set of rules. Since certain rules may be pre-selected in this manner, the system of the invention avoids having to completely fully process all rules in the access control rule set (i.e., the master set of rules). Once the method determines the selected set of rules (either all at one or rule by rule), the system then performs at least one rule operation in the rule (or rules) in the selected set of rules to produce an access control decision until either one of a rule operation including a disregard instruction is performed to limit performance of rule operations in the selected set of rules and/or until all rule operations in the selected set of rules that are applicable to the access control decision are performed. Since a disregard instruction can either halt rule processing, or can cause processing to mark or otherwise indicate certain other remaining rule operations to be disregarded in further rule processing, even though those other rule operations in the selected set of rules have not yet been processed, the developer of the rule set can create rules that are assured to only grant certain amounts or levels of permissions or access. Filter operations can be separate from the rules, or may be included as pre-ambles to each rule.

According to another configuration, the step of performing includes the step of producing an access control decision indicating whether to allow access, on behalf of a requestor submitting the access request, to an resource in the computing system environment. The resource and/or the requester providing the access request may both be local to a resource server (e.g., a computer system, workstation, access control software application, library, etc.) implementing the access control system, or, the access control processing explained herein can be performed on a computing system that is different than the one containing, providing or serving the resource or that supports the requestor. The requestor may be a computer user acting in a specific role, or may be a software application operating on behalf of such a user, or operating in an autonomous or automated manner.

In another configuration, the step of selecting includes the steps of determining an identity of the resource in the computing system environment to which access is requested in the access request and applying at least one filter operation, using the identity of the resource, for rules in the master set of rules to produce the selected set of rules for use in determining the access control decision to the resource. In this configuration, rule are selected for rule operation processing based on the resource to which access is requested in the access request.

In yet another configuration, the method includes the operation of determining a role identity of a requestor submitting the access request. In this configuration, the step of applying applies the filter operation (one or more), using the role identity of the requestor submitting the access request in combination with the identity of the resource, for rules in the master set of rules to produce the selected set of rules for use in determining the access control decision to the resource. Thus, rule selection can be based on the resource and/or the requestor asking for access to the resource and/or the type of access requested.

The invention also provides configurations in which at least one rule in the selected set of rules contains a rule operation including a unconditional disregard instruction. In such a configuration, the step of performing includes the steps of performing less than all rule operations defined within the rule(s) in the selected set of rules by sequentially performing rule operations in each rule in the selected set of rules until the unconditional disregard instruction is performed thereby terminating (e.g., halting or disabling) the performance of any remaining rule operations in the selected set of rules. As noted above, this allows the rule set creator the ability to create rules that can specifically grant certain permissions and then stop rule processing to be sure only those permissions are granted if that rule is processed, even though other rules may appear to apply to the access control decision based on the initial rule selection process using filter operations.

In another configuration, the selected set of rules is arranged hierarchically such that rules containing rule operations that are more specific are performed before rule operations that are more general. Thus if a rule that is higher up in the hierarchy of a selected set of rules (the all appear to apply to the access control decision) is performed first and contains a disregard instruction, for instance, this rule will be the last one to be performed. Thus a hierarchical arrangement of rules allows a rule set creator to customize how rule operations are applied in the event more than one rule is selected based on the filter operations. In other configurations, at least one rule in the selected set of rules contains a rule operation including a disregard instruction including disregard criteria. In these configurations, the operation or step of performing limits performance of rule operations in the selected set of rules by performing the disregard instruction containing disregard criteria such that at least one rule operation in any remaining rule operations in the selected set of rules is disregarded from further performance. Thus, a disregard instruction can include criteria that indicates or identifies other rules or specific rule operations that should not be processed when rule processing continues.

In another configuration, the system of the invention evaluates the disregard criteria against any remaining unperformed rule operations in the selected set of rules and marks any remaining unperformed rule operations in the selected set of rules that match the disregard criteria to be disregarded from further rule processing.

In another configuration, the step of selecting includes the steps of determining an identity of a resource in the computing system environment to which access is requested in the access request and applying at least one filter operation, using the identity of the resource, for rules in the master set(s) of rules to produce the selected set of rules for use in determining the access control decision to the resource. This method further includes the step of determining a role identity of a requestor submitting the access request. Also, the step of performing sequentially processes each rule operation in the selected set of rules using the role identity of the requestor submitting the access request in combination with the identity of the resource to determine if the requester using the role identity can access the resource. Thus, filter operations can test resource identities, requestor identities and even types of access requested to determine if a rule appears to apply to the access control decision.

In another configuration, the disregard instruction is a conditional instruction that has a condition, such as, for example, being based on the role identity of the requestor submitting the access request, that must be met before the disregard instruction is performed. Thus, the system can determine who is requesting access immediately before performing a disregard instruction, and if a certain identity is requesting, the rule operation processing might be disregarded or limited to processing only certain rules or rule operations thereafter, whereas if another requestor (i.e., having a different identity) is requesting access, then rule operations may continue without alteration of processing (i.e., all rule operations are processed as normal).

In another configuration, at least one rule in the selected set of rules contains a relation that defines a condition based on a group definition. In this configuration, at least one of the steps of selecting and performing includes the step of performing the relation to determine if either a requestor, an access, and/or a resource specified in the access request satisfy the condition based on the group definition. Thus relations can be used within filter operations and rule operations to perform conditional tests using, for example, requestor, access and resource information obtained from the access request.

Other embodiments of the invention provide methods for determining an authorization state of an access control system in a computing system environment. Essentially, these embodiments allow the access control system to be queried to determine its configuration state, rule applicability, and the like. In one such configuration, the method includes the steps of receiving an access request and determining either one or more of an identity of the resource in the computing system environment to which the access request is directed and/or a role identity of a requestor submitting the access request and/or an access type being requested. This configuration then applies at least one filter operation, based on at least one of the identity of the resource and the role identity of a requestor and the access type being requested, to the master set(s) of rules to produce a list of rules to which the at least one filter operation matches in order to provide an indication of the authorization state of an access control system in a computing system environment as related to the identity of the resource, the role identity of a requestor and/or the type of access requested.

In another configuration, the step of applying a filter operation applies a filter operation to determine what rules in the master set(s) of rules affect access to what resource in the computing system environment. Thus the system can support queries to determine how rules are used to determine access to a particular resource.

In another configuration, the step of applying a filter operation applies a filter operation to determine what rules in the master set(s) of rules affect what at least one requestor can do to at least one resource in the computing system environment. In yet another configuration, the step of applying a filter operation applies a filter operation to determine access control operations that a requestor can do to at least one resource in the computing system environment. These configurations allow a requestor to determine what resources that requestor can access and at what levels or types of access.

Other embodiments of the invention includes a computer system configured to provide access control according to the aforementioned methods. In such arrangements, the computer system includes at least one input/output interface, a processor, a memory system encoded with an authorization program, at least one authorization database, and an interconnection mechanism coupling the processor, the at least one input/output interface, the memory system, and the at least one authorization database. The processor performs (e.g., executes, interprets or otherwise processes) an authorization program or process (e.g., a software module, library, program, or the like) that is encoded into the memory system to provide all of the operations, methods and techniques disclosed in the method embodiments and configuration summarized above and as explained herein.

Other embodiments include a computer system configured to perform all of the aforementioned methods via software control, or via hardware configured to perform those methods and the techniques disclosed herein as the invention.

Other arrangements of the invention that are disclosed herein include software programs to perform the operations summarized above and disclosed in detail below. More particularly, a computer program product is disclosed which has a computer-readable medium including computer program logic encoded thereon to provide the access control and authorizations systems of this invention and its associated operations. The computer program logic, when executed on at least one processor with a computing system, causes the processor to perform the operations (e.g., the methods above) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone.

An example implementation of the invention that incorporates many of the aforementioned embodiments is the authorization and resource access control system provided by EMC's Symmetrix data storage system Enterprise Control Center (ECC) software manufactured by EMC Corporation of Hopkinton, Mass. Symmetrix is a registered trademark of EMC Corporation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
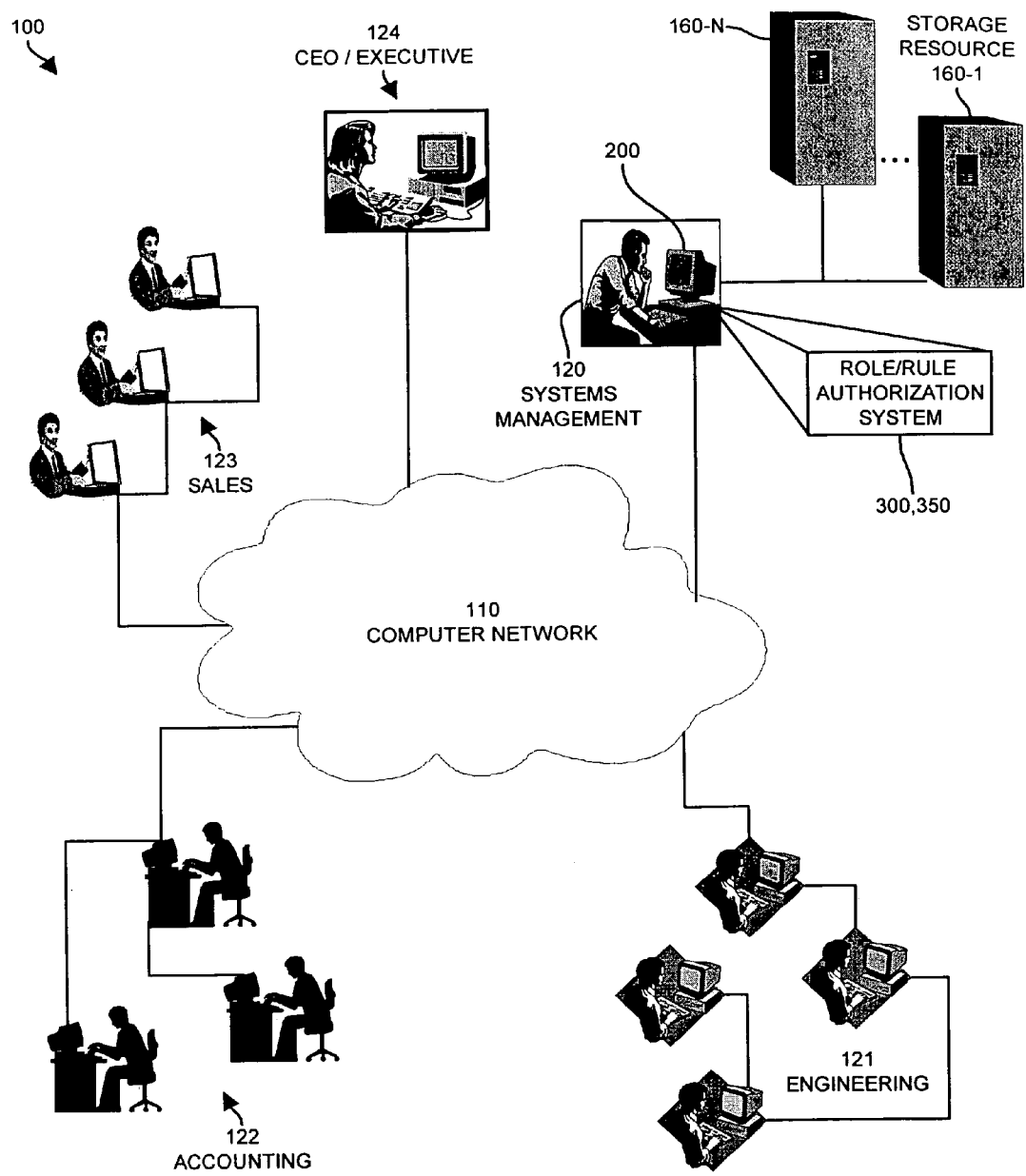
FIG. 1 illustrates an example networked computing system environment that is suitable for use in describing example operations of an access control and authorization system configured according to embodiments of the invention.

The present invention relates to unique mechanisms and techniques for providing robust access control to resources in a computing system environment. The authorization system explained herein as the invention is typically embodied as a software module (e.g., plug-in, operating system extension, dynamically linked library (DLL), or separate application) within a computer system configured to provide access control to one or more resources such as elements (e.g. files, volumes, etc.) of data storage.

Generally (and as will be explained in more detail herein), in operation, a requestor can submit an access request to the system of the invention. Access requests can specify, for example, an identity of a requestor, a type of access requested, and a resource to which this requester requests the access. The system can process this access request against one or more rules selected from a master set of rules which define an access control policy. Instead of processing the access request against the entire set of rules, the system can preferably first select certain rules which might apply to a determination of an access control decision by using filter operations. Filter operations might, for example, select all rules that apply to the resource to which access is requested, or might select only those rules from the master set of rules that apply to a specific role identity of the requestor (e.g., rules that apply to a database administrator), or to a type of access requested (e.g., rules that apply to a configure access request). The system then applies the access request against the selected set of rules (i.e., a subset of the master set of rules, determined based on the filter operations) that define rule operations to determine an access control decision. Rule operations might, for instance, grant or deny specific permissions to the requestor for the specific resource. The system applies or performs rule operations until either all rule operations defined in the selected set of rules are performed or until a disregard instruction is processed within a rule operation. A disregard instruction is a special command or statement in a rule operation that can, for instance, halt rule processing or further narrow rule operations or rules that are to be applied from thereon during further rule processing of the selected set of rules.

Since rules can include rule operations that contain disregard instructions (to be explained), rule operation processing may perform less than all remaining rule operations from the selected set of rules (initially selected via filter operations). In one embodiment, this allows an administrator to create a rule hierarchy which can result in processing only a subset of rule operations from the selected set of rules that appear to be applicable to the access control decision based on one or more initially applied filter operations. In essence, the invention can provide a tiered processing access control approach, which allows creation of precise access control policies. The system allows an administrator to create rules that can define unique roles, types of access and permissions to precisely control access to one or more resources.

In embodiments that provide a disregard instruction that halts rule processing, rules can be arranged in a hierarchical order such that a rule containing a disregard instruction that halts processing will cause access control processing to be terminated, leaving the requestor with any permissions granted thus far from access control (i.e., rule) processing up to this point. In embodiments where the disregard instruction is conditional and/or defines criteria to further limit rule processing, processing of rule operations may continue after performance of the disregard instruction, but further rules or rule operations in the selected set of rules that match the criteria of the disregard instruction(s) will not be processed. As will be explained in more detail, conditional disregard instructions that specify certain criteria can thus allow a security administrator to be less concerned with the arrangement of rules in a particular order, since the disregard instruction will cause rule processing to continue but without performing rule operations that match the specified disregard criteria.

The invention is based in part on the observation that most computing system environments allow a single user to act in different roles. Some users may require limited access to various computing system resources at certain times, while the same or other users might require more involved or more open access to resources at the same or at different times. A user may be acting in a role (e.g., as a payroll database administrator) on a computer system that conflicts with the access control permissions of other roles that the same, or a different user, is able to act in (e.g., as an employee). As a simple example, as an employee, a user should not be able to access payroll data in certain manners (e.g., read or modify) for security reasons, but as an administrator of the payroll database, the user's job may be to maintain (e.g., backup, copy, establish a mirror copy, etc., but not specifically change or even read) data within the payroll database, including data related to that or another users salary, bonus, and the like. It should be clear that a conflict of interest arises in this situation since only limited access to the data might be required. The invention helps to impose proper access control and authorization mechanisms in such a scenario. Conventional access control systems can fail or can become complex to institute in such situations because while, for instance, read access might be denied, write access might enable a user to overwrite sensitive data. In other words, conventional systems with rigid permissions are cumbersome to use when trying to implement graduated access control scenarios based on specific resources being accessed, identities of requestors, and/or specific or precise types of access required. Such systems must rely heavily on the trust of individuals to not improperly access data.

The invention is also based in part on the observation that resources that require access control (e.g., files, databases, directories, computer and storage systems, peripherals, file servers, and so forth) are often arranged in relationships that might be logical, physical and/or organizationally-based and that are often not strictly hierarchical in nature. In contrast, conventional access control system are predominantly hierarchical as they have been developed only to access to file system data that is hierarchically arranged. This invention recognizes that many other resources besides file system data might require access control and that such resources might be arranged in many ways in relation to each other, users, and the like. For example, logically, a payroll data storage system might be associated with the accounting department. Organizationally, however, the human resources department might need to maintain the contents of the payroll data storage system. Physically, however, this same payroll data storage system might be located, perhaps, on a secure portion of a corporate computer network with other unrelated computer systems (that also require security) that are far removed physically from the accounting and human resource departments and their local networks of computer systems. Relationships between the various resources that require authorization and access control, and the actors (i.e., computer users or other requestors of access), are sometimes many-to-many. Conventional access control systems are not generally well adapted to control access in computer systems where resources are related to each other via non-hierarchical as well as hierarchical relationships.

To significantly overcome conventional access control limitations such as those noted above, the system of the invention provides a flexible access control mechanism that is uniquely role-based, rule-based and resource-based. Role-based access control according to this invention can account for the different roles that may be required when a requestor (e.g., a user or a program acting on behalf of a user) requests access to a resource, while the rule-based aspects of the system of the invention provide simplicity of access control administration while concurrently accounting for different relationships that might exist between requesters, types of requested access, and resources for which those requesters have requested such access.

Preferred embodiments of the invention can provide such features using a single master set of access control rules that can be uniquely composed and arranged (as explained herein). As noted above, the system can use the master set of rules to provide access control decisions based upon the applicability of certain of those rules to a particular requestor requesting access to a particular resource in a computing system environment, or based upon the resource to which access is requested, or based on the type of access requested. Query operations are also supported. As will discussed in detail, by selectively composing rules and arranging rule operations in a pre-determined manner (preferably, from more specific to more general) and/or by using disregard instructions, access control permissions that rule operations assign or grant can be intuitively established and applied in a controlled manner without granting too much or too little access.

FIG. 1 illustrates an example computing system environment 100 in which the present invention can be applied to provide authorization and access control to various computing system resources. In this example, the computing system environment 100 represents a typical corporate computer network and includes departments 120 through 124 that each have various computer users using one or more computing systems coupled to each other via a computer network 110. The departments in this example include a systems management department 120, an engineering department 121, an accounting department 122, a sales department 123 and a CEO/executive (i.e., management) department 124. Computer users who are members of a particular department might be stored in a database (not shown in this figure), for example. The computing environment 100 also includes a resource server 200, which in this example is a workstation computer system (being operated by a systems manager 120) configured to provide access to (i.e., to serve) data stored within the data storage systems 160-1 through 160-N to the various computer systems within the departments 120 through 124. In this example, the resources to which the system of the invention governs authorization are the data storage systems 160-1 through 160-N, which can be, for example, high-capacity data storage systems such as one or more SYMMETRIX data storage systems manufactured by EMC Corporation of Hopkinton, Mass. SYMMETRIX is a registered trademark of EMC Corporation. Within the resource server 200, a role/rule-based authorization system 300, 350 configured according to the invention provides an authorization and access control mechanism to govern access on behalf of computer users (i.e., people in the various departments 120 through 124) to resources such as data, files, databases, volumes, partitions and the like stored within the data storage systems 160-1 through 160-N (the resources).

The computer users in the departments 120 through 124 shown in FIG. 1 represent different divisions of labor within a corporate enterprise. Within each department 120 through 124, there might be a number of computer users who need to create and store data within designated areas (e.g., volumes) of the data storage system resources 160. Perhaps there might also be one or more people within each department that are assigned the task of administering software applications, databases, files, filesystems, directories, volumes or the like which store data and/or programs created and/or used by their respective departments (i.e., one of 120 through 124) within one or more of the data storage systems 160. The company might designate such people as departmental administrators or local systems managers, for example. Some departments, such as the accounting department 122, might have specific software applications (e.g., payroll or other accounting specific software programs) requiring special systems administration skills and/or configuration privileges. Some data (files and/or databases) created or maintained by a department might require secure or controlled access by only a limited number of people. For instance, the engineering department might be working on secret software code that should be accessed by those computer users authorized to do so. As another example, computer systems should only allow salary and payroll data to be viewed by those people in the accounting and/or the CEO/executive departments that are authorized (in accordance with the system of this invention) to read this sensitive material, while only one or more other computer users (e.g., the CEO) in this same department (i.e., group) might be allowed to have write or change permission to salary or bonus data. In other words, a computing environment such as that shown in FIG. 1 can require, for example, some people to have configuration or backup access to data and/or programs without being able to actually read the data, while other people might require the ability to read and/or write existing data or make only limited changes to the data.

As these requirements in this example scenario pertain to authorization and access control of data stored within the data storage systems 160-1 through 160-N, an example analysis of the various roles users might require to access various resources according to various types of required access for each different role reveals that a complex set of authorization and access control relationships can exist. The present invention provides an authorization and access control system that can establish and grant appropriate levels of required access (e.g., backup and configure only, no read or write) for a required requestor (e.g., a user acting in a particular role) to a required resource (e.g., data storage system 160 or portion thereof). Table 1 below illustrates an example of such an analysis and illustrates some sample detailed access control requirements for various requestor roles, resources and required levels of access for a corporate computer networking environment such as that shown in FIG. 1.

TABLE 1

Role Requestor/Resource/Required Access

| REQUESTOR ROLE | RESOURCE TO ACCESS | REQUIRED ACCESS |
|---|---|---|
| Storage Planner | Data storage systems (e.g., 160) | Define storage classes<br>Define RAID levels<br>Volume configuration<br>Establish Backup Regimens<br>Establish Levels of remote or redundant protection |
| Database Administrator (X) | X - one or more databases | Do Backup Operator(X) (see below)<br>Make a point-in-time copy of the database for users<br>Add space for database use<br>Create or allocate volumes<br>Format these volumes and add them to host volume groups<br>Do Trouble Handler(X) (see below)<br>Do Workload Analyzer(X) (see below)<br>Set up automatic response scripts affecting X<br>Specify the conditions that trigger scripts<br>Specify the actions to be performed upon certain events |
| Application Administrator (X) | X - one or more applications | Same as for Database Administrator(X) |
| Allocator(X) | X - one or more storage pools | Create a new volume, and set up detachable volume(s), mirror(s), and/or remote data facility relationships<br>Allocate a free volume<br>Free a volume<br>Connect a volume to one or more hosts<br>Format the volume and put it into use |
| Divider(X) | X is a data storage system (e.g., one or more of 160) | Divide the storage of a data storage systems (e.g., 160) into storage pools |
| Monitor | Whole data center (e.g., data storage systems 160 and associated resource server(s) 200) | Monitor health and performance of storage hardware and software<br>Observe alerts<br>Handle automatic pages and e-mail<br>Scan status displays<br>Take site-prescribed action, such as calling/messaging service technician |
| Monitoring Adjuster(X) | X is a data storage system or other piece of hardware, a storage area network (e.g., a fabric), or a software system | Set thresholds and conditions for alerts, pages, e-mail, and other automatic responses |
| Workload Analyzer(X) | X is a data storage system or other piece of hardware, a storage area network (e.g., a fabric), or a database or application | Examine performance data<br>Find and foresee bottlenecks<br>Move data or cables around to fix bottlenecks<br>Use analysis tools (e.g., Workload Optimizers) and/or data-migration tools<br>Recommend purchases/solutions to fix or prevent bottlenecks |
| Workload Monitoring Adjuster(X) | X is a data storage system or other piece of hardware, a storage area network (e.g., a fabric), or a database or application | Control what workload data can get captured for analysis and how long the data is retained for analysis |
| Site Service | A type of host | Diagnose and repair or replace vendor |

TABLE 1-continued

Role Requestor/Resource/Required Access

| REQUESTOR ROLE | RESOURCE TO ACCESS | REQUIRED ACCESS |
|---|---|---|
| Technician | (e.g., NT, UNIX, MVS, AS/400, etc.), a type of hardware, or whole data center | specific (e.g., EMC) equipment (e.g., for a customer that foregoes vendor service) Diagnose and repair or replace non-vendor specific equipment (e.g., cabling) Install and fix host or resource server software |
| Vendor specific (e.g., EMC) service technician | All vendor equipment in data center | Dial into service processor (e.g., resource server 200) for diagnosis Perform on-site diagnosis and repair of vendor products (e.g., data storage systems 160) |
| Backup Operator(X) | X is a type of host, such as UNIX, NT, MVS, or is a database, file, volume or application | Make a copy of X and take the copy offline for backup purposes while primary copy remains available for use Quiesce and unquiesce X if X is an application or database Manipulate storage volumes Back up X to tape Restore X Take the application, database, or mount point offline and online Restore data from tape Restore pieces of X |
| Trouble Handler(X) | X is a database, application, logical or other type of data storage system volume | Determine that X has failed or its performance is problematic If X is a volume that has failed and has a mirror copy, make the mirror the primary use copy and activate a remote instance of application (e.g., server) If X is a volume that has failed, allocate a new volume and restore data onto new volume; entails Allocator(Y) for some storage pool Y and Backup Operator(X) privileges Take site-specific action, such as moving files Create automatic scripts that accomplish the foregoing when needed (see Monitoring Adjuster, above) |
| Special(X) | X may be any site particular resource | Site-defined, allows flexibility. |

As FIG. 1 and Table 1 illustrate, in a typical computing environment there can be many requestors having different roles that require different types or levels of access to different resources. It would be quite cumbersome for a systems manager or other user to attempt to configure and properly maintain a conventional access control configuration using ACLs and/or permissions to govern authorization as specified in Table 1. The present invention however provides a more concise mechanism using one or more rule sets that can be adapted to model such access control requirements with greater ease than conventional systems.

In this description, the term "requestor" refers to one or more entities requesting one or more types of access to one or more resources. Typically, a requestor is a software process within a computer system that operates on behalf of, or under the control of a computer user who has logged into the computing system and who has an associated requestor role identity (to be explained). Generally then, the requestor is the computer user having a specific role identity, though alternative embodiments of the invention can allow the requestor to be, for instance, another computer system or an autonomous process or a device.

Figure 2:
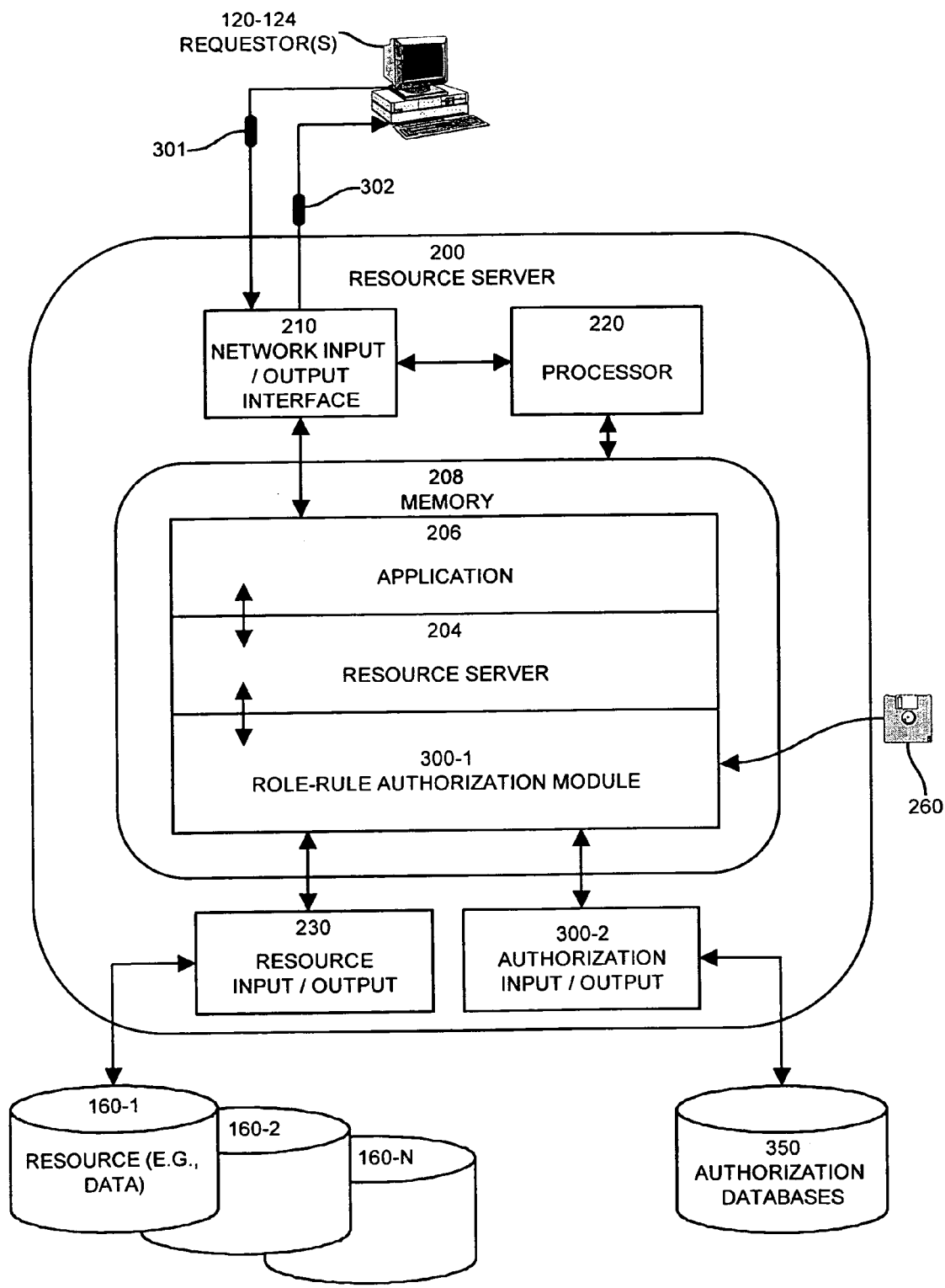
FIG. 2 illustrates an example high-level architecture of a resource server equipped with a role/rule-based access control system configured in accordance with an embodiment of the invention.

FIG. 2 illustrates an example of a high level architecture of the resource server 200 (from FIG. 1) that is equipped with an authorization system configured according to certain embodiments of the invention.

As illustrated, the resource server 200 provides authorization and access control to resources 160-1 through 160-N on behalf of client departmental computer systems operated by computer users using software applications which, in this example, act as requesters 120 through 124 (i.e., the computer users in the various departments 120 through 124 are the requestors in this example). The resource server 200 receives access requests 301 for access to one or more resources 160. When the resource server 200 completes the authorization process according to embodiments of this invention (to be explained), the resource server 200 provides an access control decision 302 and/or data back to the requestor(s) 120 through 124. The access control decision 302 can indicate, for example, either an acceptance or a denial of access to the requested resource 160 for the requesting requestor 120 through 124, or may simply indicate which permission(s) (to be explained) were provided to the requestor for the resource based on the processing of the system of the invention.

In this example embodiment, the resource server 200 includes a network input/output interface 210 for communicating with the requestors 120 through 124 (i.e., for receiving access requests 301 and providing/transmitting access control decisions 302), a processor 220, and a memory 208 encoded with various software entities 204, 206 and 300-1. These software entities include an application 206, a resource server 204, and a role-rule authorization module 300-1. The processor 220 assists in controlling (i.e., passing data through) the network input/output interface 200 and is primarily responsible for executing or otherwise performing (e.g., interpreting, running) the software entities 204, 206 and 300-1, as explained herein. The resource server 200 also includes a resource input/output interface 230 which is capable of accessing the resources 160, as well as an authorization input/output interface 300-2 which is provided as part of this embodiment of the invention and is capable of accessing a set of authorization databases 350. Interfaces 230 and 300-2 are illustrated as separate from each other, though they may be embodied in a single physical or software enabled interface.

In this embodiment, the authorization and access control system of the invention specifically includes the role-rule authorization module 300-1, the authorization input/output interface 300-2 and the authorization databases 350. The role-rule authorization module 300-1 is preferably a software program, library, module, plug-in or other type of executable or performable entity that governs and/or controls access to resources 160 accessible by the resource server 200. The role-rule authorization module 300-1 may be included as a software program on a disk 260 which is loaded into the resource server 200 as an extension to off-the-shelf authentication and access control capabilities, such as those provided by an operating system (not specifically shown). The role-rule authorization module 300-1 may be an application programming interface (API), a dynamically linked library useable by applications, or any other type of performable entity (e.g., executable, run-able, interpretable, etc.) within the resource server 200.

In operation of the system shown in FIG. 2, the resource server 200 accepts requests 301 for access to data stored, for example, within one of the resources 160. The network input/output interface 210 passes the access request 301 to the application 206. The application 206, which may be any type of software application (e.g., a database server program, a web server, or data storage system device driver software), in turn accepts the access request 301 and forwards the same or a similar (e.g., translated) access request 301 to the resource server 204. The resource server 204 then forwards the same or a similar (e.g., a translation) access request 301 to the role-rule authorization module 300-1. The resource server 204 can forward the access request 301 directly to the role-rule authorization module 300-1 via an API (illustrated by vertical arrows), for example. No access is granted to the requested resource specified in the access request 301 until the access request 301 is processed by the role-rule authorization module 300-1. It should be understood that variations on this general example are contemplated as being within the scope of this invention. For example, an application may act to provide an access request on behalf of a user at any time. In such a case, the application 206 may reside (e.g., execute) on the resource server computer system 200 or on another computer system. Upon occurrence of an event, the application 206 may wake-up and attempt to perform an action on behalf of a user (which may require access to one or more resources). In performing the action, the application makes access requests to the resource server 204, which then uses the invention to determine whether the user (i.e., the application acting on behalf of the user) should be granted access in the requested manner.

Generally, the role-rule authorization module 300-1 receives and examines the access request 301 and selects, based on the access request 301 and one or more filter operations (not shown in this figure, to be further explained), a selected set of rules (not shown in this figure) from the authorization databases 350 that are to be used to produce the access control decision 302. The access request 301 might specify, for example, that a particular requestor 120 through 124 (e.g., a computer user in a department) acting in one of the roles from Table 1 (e.g., Backup Operator) above needs a specific type of access, such as the ability to configure, copy or backup a volume of storage in the data storage system resource 160-1. Once the role-rule authorization module 300-1 has selected or determined what rules (to be explained) generally apply to such an access control decision (based on filter operations), the role-rule authorization module 300-1 performs rule operations in a selected set of rules to determine the access control decision 302. The role-rule authorization module 300-1 applies rule operations (i.e., performs rule processing) in the selected set of rules based on information in the access request 301. The role-rule authorization module 300-1 performs rule processing of one or more rule operations, some of which may include a disregard instruction (to be explained) which further limits performance of applicable rule operations in the selected set of rules. Rule processing continues until all rule operations in the selected set of rules are performed.

It is to be understood that a disregard instruction may halt rule operations by instructing the role-rule authorization module 300-1 to disregard all unprocessed rules and rule operations, or, the disregard instruction may specify disregard criteria that the role-rule authorization module 300-1 can use during further rule processing to process any remaining applicable rule operations. The term "applicable" in this sense thus takes into account the disregard criteria to determine if rule operations that were initially determined to be applicable based on one or more filter operations are still applicable in light of the disregard criteria. In this manner, the organization and construction of rules in a rule set in the authorization databases 350 can control the granularity of access control and authorization to resources (e.g., 160).

Figure 3:
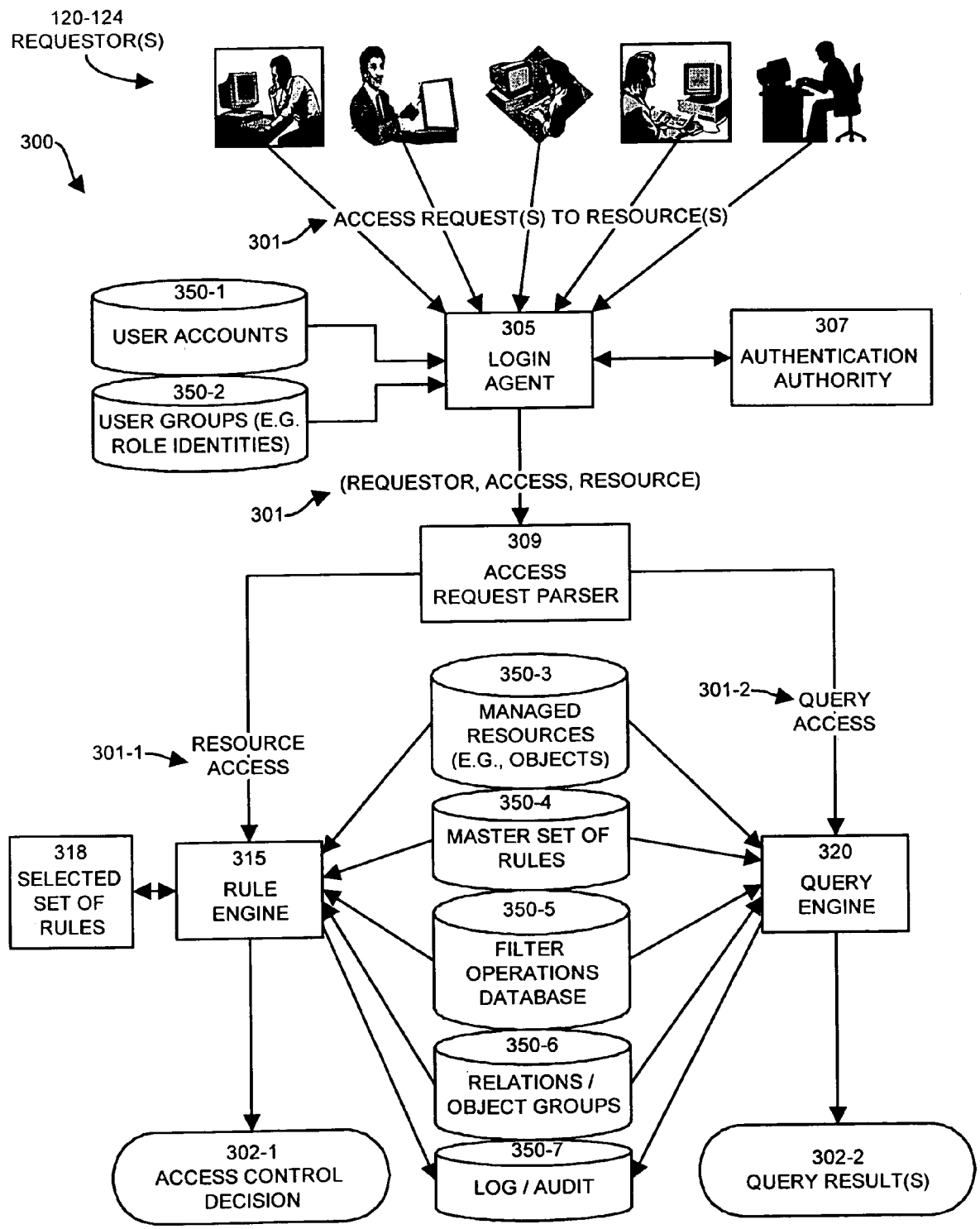
FIG. 3 illustrates an example software architecture of an embodiment of the role/rule-based access control system configured in accordance with the invention.

FIG. 3 illustrates an example software architecture for an authorization system 300 configured in accordance with an embodiment of the invention. The authorization system 300 includes various authorization databases 350. In this embodiment, the authorization databases 350 include a managed resources database 350-3, a master set of rules 350-4, a filter operations database 350-5, a relations and object groups database 350-6, and a log and audit database 350-7. In this example, the authorization system 300 also includes a login agent 305, an authentication authority 307, an access request parser 309, a rule engine 31 and a query engine 320.

The requestors 120 through 124 (e.g., computer users from the various departments shown in FIG. 1) obtain access to the resource server 200 (FIG. 2) via the login agent 305. Databases 350-1 (user accounts) and 350-2 (user groups/role identities) contain various data records used during the login process. The authentication authority 307 authenticates communications (e.g., access requests 301) between the resource server 200 and the computer user (requesters 120 through 124). During the login process, the login agent 305, for example, obtains a username and password (not shown) from a particular requestor (i.e., one of 120 through 124) and validates this information against data maintained in the user accounts database 350-2. Once validated, the login agent 305 can assign a default user identification number (uid) and user group number (gid) to the requestor 120 through 124. A user group might specify, or correspond to a departmental or role identity such as one of the role identities shown in Table 1 above. The requestors 120 through 124 may be local users to the resource server 200, or they may connect to the resource server 200 via a network such as computer network 110 in FIG. 1.

The login agent processing is not critical to embodiments of the invention, but is shown here for completeness. It is to be understood that the identity of a role of the requestor (e.g., 120) is determined at some point before or during (i.e., in conjunction with) receipt of an access request 301. In this example, the login agent 305 handles obtaining the requester role at the time of login, as well as passing the access requests 301 to the access request parser 309. In alternative embodiments, the login process might be separate from the receipt of access requests 301 and the requestor identity (i.e., the role that the requestor is acting as with respect to an access control decision) might be specified within one or more of the access requests 301 themselves.

The general content or syntax of an example access request 301 is shown in FIG. 3 below the login agent 305 as the tuple 301 (REQUESTOR, ACCESS, RESOURCE). This example access request 301 specifies an identity or role of the requestor ("REQUESTOR"), a type of access that is being requested ("ACCESS"), and an identity of a resource to which access is being requested ("RESOURCE"). Generally, the access request parser 309 parses this access request 301 and passes the requester, access and resource information to either a rule engine 315 (if an authorization and access control decision are required based on the access request) or to a query engine 320 (if the access request is a query access request used to provide an indication to the requestor of the authorization state of the access control system).

In this example embodiment, there can thus be two different types of access requests: a resource access request 301-1 or a query access request 301-2. The rule engine 315 processes resource access requests 301-1 which allow a requestor 120 through 124 to request a specific type of access to a specific resource and causes the authorization system 300 to determine an access control decision 302-1 via the rule engine 315 indicating if the requested access is granted or not via rule processing. In other words, a resource access request 301-1 causes the authorization system 300 to perform the operation of granting or denying access to a resource (e.g., 160) based on who is asking for access (i.e., which requestor 120 through 124 acting in what role) and/or based on what type of access is requested and/or based on what resource is being requested (i.e., resource identity) as processed against a master set of rules 350-4 and other databases 350, as will be explained.

The query engine 320 processes query access requests 301-2 to determine query results 302-2 that indicate an authorization state of the access control system as related to the resource, requestor or type of access being requested. That is, a query access request 301-2 allows requestors 120 through 124 to query the authorization system 300 of the invention for information concerning the authorization state of access control with respect to a particular requestor, type of access or resource. Based on the query access requests 301-2, the query engine 320 produces query results 302-2 that indicate, for example, what rules are applied to what access control decisions. As another example, a requestor 120 through 124 can provide a query access request 301-2 to the access control system 300 of the invention to determine what levels of access that requestor has to certain resources (e.g., 160) (i.e., query for permissions). A requestor can also query the system 300 to determine what rules apply to a specific resource or to a specific requestor based on a specific type of access requested.

To perform these operations, the rule and query engines 315, 320 access various data structures within the authorization databases 350-3 through 350-7 to service resource access requests 301-1 (via the rule engine 315) or query access requests 301-2 (via the query engine 320). The primary databases used by the system 300 for access control and query processing are the managed resources database 350-3 and the master set of rules database 350-4.

Generally, the resource server 200 maintains information concerning resources (e.g., data storage systems 160-1 through 160-N or portions such as volumes, files, records, or directories stored therein) to be accessed by requestors 120 through 124 within a managed resources database 350-3. Preferably, the managed resources database 350-5 is a set of objects (e.g., object oriented data structures) that represent the various resources or other components to which access/permissions can be granted or denied. As an example, the managed resources database 350-5 might contain one or more objects (e.g., database records, data structures, lists, or the like) for each data storage system 160, as well as for components (e.g. volumes) that make-up the data storage systems 160.

Figure 4:
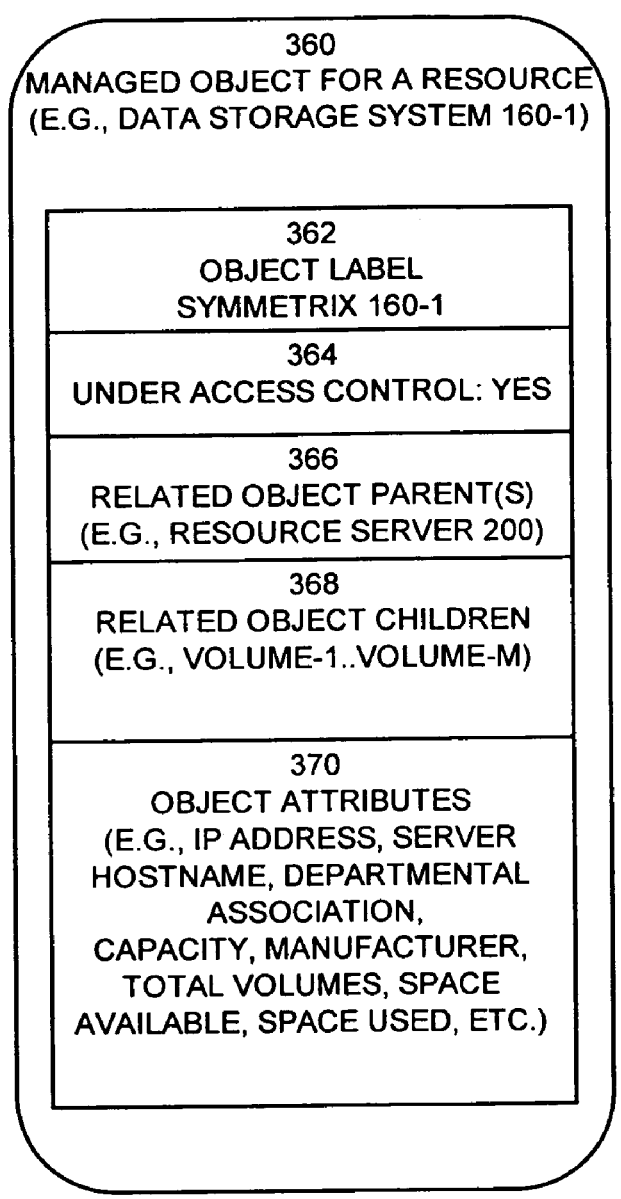
FIG. 4 illustrates an example of a managed object, maintained in a database of managed resources, that represents a data storage system resource to which access can be controlled by the system of the invention.

FIG. 4 illustrates an example portion of a managed object 360 that represents the data storage system 160-1, as contained within the managed object database 350-5. As shown, the managed object 360 includes various data fields 362 through 370 that store information and attributes related to the object represented. The object label field 362 identifies the actual resource which this object 360 represents, which in this example is a SYMMETRIX data storage system 160-1 manufactured by EMC Corporation of Hopkinton, Mass.

Within the resource object 360, the access control data field 364 indicates whether or not the resource (i.e., the data storage system 160-1) represented by this object is under access control by the system of the invention (i.e., if access to this resource can be governed by the access control system 300), and the data field 366 indicates that this resource 160 is related to the resource server 200 via the related object parents field 366. The related object parents field 366 indicates (e.g., is a pointer to) the group or groups definitions (e.g., from object group definitions database 350-6, to be explained) that this object 360 is a member. In this example (FIG. 1), since the data storage system 160-1 is served by the resource server 200, it is considered, for purposes herein, to be related in a parent child relationship (as the child) to the resource server 200. In a similar manner, the related object children field 368 indicates any objects which are related to the object 360 in a child-like relationship. In this example, the child objects of the data storage system 160-1 are volume objects VOLUME-1 through VOLUME-M (not specifically shown in figures). These are the volumes that store data within the data storage system 160-1. The object attributes data field 370 contains values (not specifically shown) for various attributes and/or configuration information related to the object 360 such as the resource's IP address, server hostname, departmental association(s), capacity, manufacturer, number of volumes, space available, space used, and so forth. It is to be understood that the object 360 shown in FIG. 4 is provided as an example only and is not meant to be limiting to this invention. Thus, an object 360 representing a file might have different fields and attributes, such as size of the file, name of the file, creator, software applications that use or access the file, volume that stores the file (e.g., as a parent), other files referenced by the file (e.g., as children), and the like.

Other representative managed objects that the resource server 200 might maintain in the managed object database 350-3 (FIG. 3) include objects for files (as in the example above), directories, volumes, partitions, connections, departments, specific databases (e.g., payroll data), specific records in a database (e.g., CEO salary data), applications, networking devices, entire computer systems, users, and/or the like. Generally, the authorization system 300 can treat each portion of data (e.g., records, files, databases, software applications, etc.) or computing entity (e.g., each departmental computer, network device—routers, switches, hubs, etc), storage device (e.g., 160, or file servers, web servers, etc.), peripheral device (e.g., printers, scanner, copiers, etc.) within a computing environment (e.g., 100 in FIG. 1) as an accessible resource with respect to access control and authorization. Each entity can be represented as a managed object within the managed resources database 350-3. An entity can be as small, for example, as a single bit, byte, file or record in a database or memory or program, or may be as large as an entire data storage system storing hundreds of gigabytes of data. Conventional access control mechanisms generally do not provide access control for such a broad range of entities.

A commercial database package such as ORACLE (trademarked and manufactured by Oracle Corporation) or an object-oriented database can be used to maintain the database of managed resources 350-3 (as well as other databases 350), or each managed object (e.g., 360) can be maintained as an independent data structure in an object-oriented or other programming environment such as those provided by the Java or C++ computing language and software development environments.

Returning attention to FIG. 3, to perform processing of resource access requests 301-1 (requests for granting of permissions to access the resource), the rule engine 315 also uses the master set of rules 350-3, in conjunction with other authorization databases 350 to produce access control decisions 302-2 concerning access to one or more resources represented in the managed resources database 350-5.

The master set of rules 350-3 is generally an expression of an access control policy which may be specific (or general) to a particular computing environment (e.g., 100 in FIG. 1). For example, the master set of rules 350-3 might embody the access control and authorization policies expressed in Table 1 above. The master set of rules 350-3 expresses the access control and authorization rights and permissions for requestors, to resources, for various types of access. Rules in the master set of rules 350-3 may be specific (e.g., apply to one resource, requestor role or type of access) or they may be general in nature (e.g., apply to many requestors or resources or types of access). The rule engine 315 produces an access control decision 301-1 indicating whether to allow access, on behalf of the specified requestor 120 through 124 submitting the access request 301-1 to a resource (e.g., 160) in the computing system environment.

In this invention, the master set of rules 350-3 may be large or small, and some rules defined therein may apply to some resources (e.g., some portions of data storage systems 160, such as volumes, files, directories and the like), requestors (e.g., to one or more of 120 through 124) or types of access (e.g., configure, read, write, etc.), while other rules apply to different resources, requestors and types of access. Instead of simply applying all rules in an access control decision, the system of the invention determines what rules apply to what access control situations based on information from the access request 301. To do so, the rule engine 315 (or query engine 320 if a query access request 301-1 is processed) can consult a set of filter operations defined in the filter operations database 350-6. Though shown as a separate database 350-6, the filter operations can be incorporated into the rules (e.g., as a pre-amble or pre-test in each rule) defined within the master set of rules 350-3.

Figure 5:
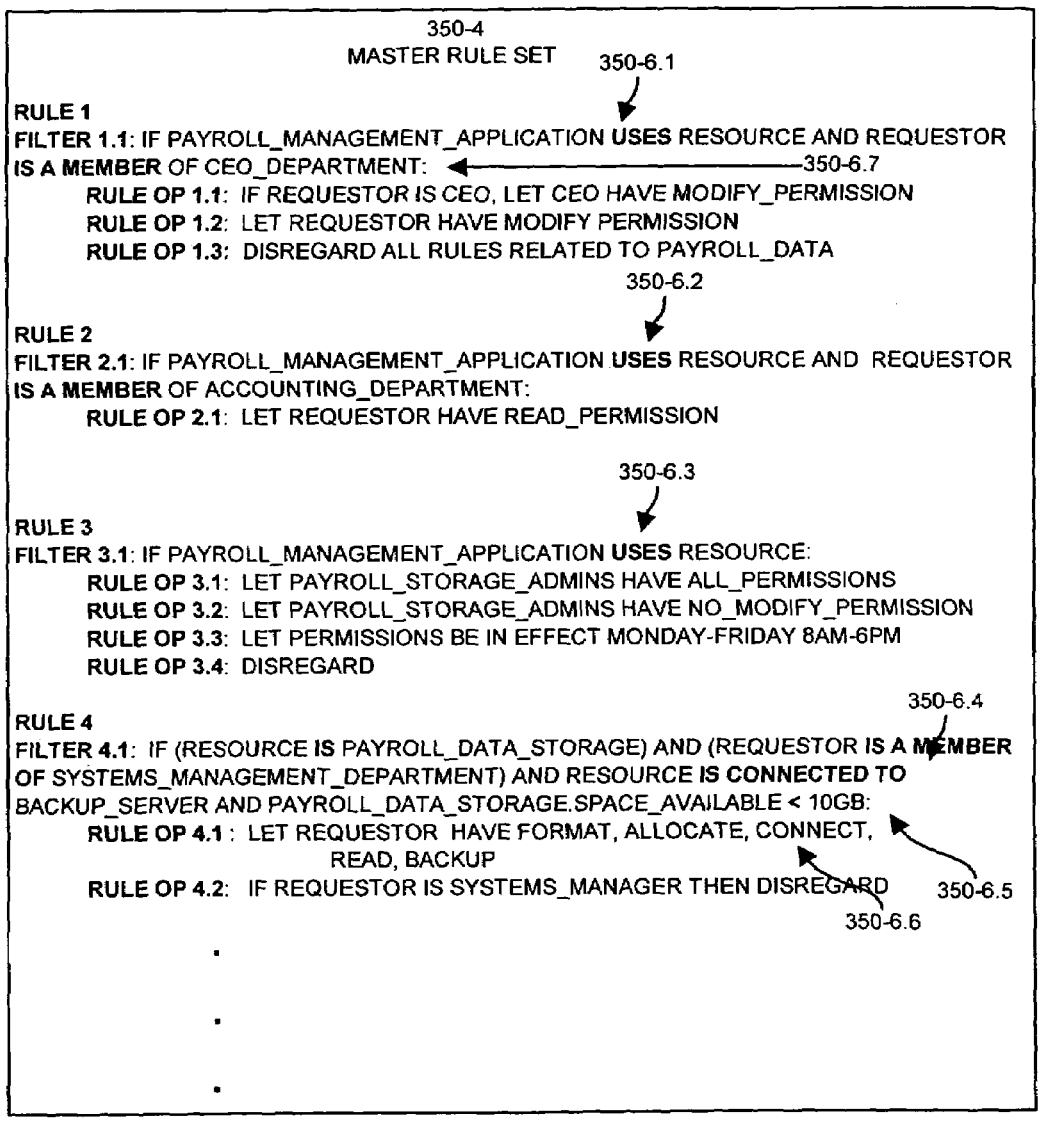
FIG. 5 is an example of a sample set of rules from an example master rule set showing one possible syntax and rule structure for rules and rule operations, and filters and filter operations as provided in accordance with an embodiment of the invention.

FIG. 5 illustrates an example of a subset of rules excerpted from the master set of rules 350-3. Four rules are shown in this example. In these examples, each rule is composed of a filter operation (FILTER X.1) and one or more rule operations (shown as RULE OP X.Y, where X is the rule number and Y is the rule operation number within the Rule X). The rule operations generally can assign or provide (or deny or remove) specific (or general) permissions to a resource or a requestor in a given access control scenario (i.e., based upon an access request and the content and construction of the rules), or can limit rule processing in the case of disregard instruction rule operations (to be explained). Each rule incorporates the filter operation (filter operations 1.1 through 4.1), selected or referenced from the filter operations database 350-5, as well as one or more rule operations (Rule OPs). That is, while FIG. 5 illustrates rules including filter operations and rule operations, each filter and rule operation can be separately defined in databases and rules can be constructed from a mixture of each.

The filter operations are used to filter out or pre-select which rules from the master set of rules 350-4 apply to certain criteria within the current access request. Since the master set of rules 350-4 might be quite large and/or may contain rules that do not apply to a given access control scenario, the rule engine 315 can perform filter operations to determine which rules apply to a given access control situation without having to examine, perform or test or apply the entire contents (i.e., all rule operations or conditions) of every rule. For example, a filter operation might specify selection of any rule that applies to a specific resource, or a specific requestor, or for a specific type of access, or to any combination thereof. If a filter operation applies, then the rule engine 315 selects the rule having the applicable filter operation to be included in a selected set of rules 318 that the rule engine 315 (or query engine 320) can process to determine the access control decision 302-1 or query results 302-2. In a sense, the rule engine 315 uses filter operations to test and to select a set of rule operations which will then be further processed based on the access request information (requestor, resource and/or access control, or a combination thereof).

An access control designer (a person, not shown, responsible for authoring the rule set 350-4) can create the rule set 350-4 by writing various filter operations and rule operations using a selection of relation functions and/or group definitions (shown as 350-6.1 through 350-6.7 in this example) chosen from the relations and object groups database 350-6. Relation functions (350-6.1 through 350-6.6 in this example) are essentially functions (e.g., binary relations commonly found in database languages) that can be used to develop filter and rule operations for use in the rule set 350-4. Example relations shown in this example are "USES" 350-6.1, "IS A MEMBER OF" 350-6.2, "IS CONNECTED TO" 350-6.3 and "<" 350-6.4. It should be understood that this list is not exhaustive.

Group definitions (350-6.7 in this example) are simply objects that define or reference one or more other objects according to some sort of relationship. An example of a group definition is the "CEO_DEPARTMENT" group definition 350-6.7 shown in rule 1 in the sample rule set 350-4. This group definition 350-6.7 is essentially an object that defines or references (e.g., via pointers) a list of members (e.g., other object resources 350-5 such as computer users, software applications, computers or other entities) that are considered, for access control purposes, to be in the CEO/Executive department 124 (FIG. 1). The "ACCOUNTING_DEPARTMENT" in Rule 2 is another example of a group definition that references or defines all member objects of the accounting department.

A brief analysis of an example rule will assist in understanding details of rule processing presented thereafter.

Rule 1 appears as follows (provided here for ease of reference):

RULE 1
FILTER 1.1: IF PAYROLL_MANAGEMENT_APPLICATION USES RESOURCE AND REQUESTOR IS A MEMBER OF CEO_DEPARTMENT:
  RULE OP 1.1: IF REQUESTOR IS CEO LET REQUESTOR HAVE MODIFY PERMISSION
  RULE OP 1.2: LET REQUESTOR HAVE READ PERMISSION
  RULE OP 1.3: DISREGARD ALL RULES RELATED TO PAYROLL_DATA

The rule engine 315 can determine if Rule 1 applies to a given access control request 301 using Rule 1's filter operation (FILTER 1.1) which allows the rule engine 315 to determine if a payroll management application called "PAYROLL_MANAGEMENT_APPLICATION" uses the resource (RESOURCE) specified in the access request 301 and if the identity of the requestor (REQUESTOR) specified in the access request 301 is a member of the CEO/executive department 124 (FIG. 1). In other words, the rule engine will not select Rule 1 for applicability in determining an access control decision 302-1 or query results 302-2 (i.e., will not include Rule 1 in the selected set of rules 318) unless the Filter operation 1.1 is satisfied. As will be explained shortly, filter operations allow the rule and query engines 315 to 320 to narrow down the rules that might be applied when processing a query or access control request 301, thus saving processing time by not having to process all of the rule operations in the rule set 350-4.

Processing logic (e.g., code) within the rule engine 315 that determines results of filter operations (and rule operations, to be explained) can consult information within the databases 350 to reach a determination of the conditions or tests expressed in each filter and/or rule operation. The rule engine 315 can incorporate known logic processing techniques such as structured query language (SQL) processing techniques to evaluate and determine results of filter and rule operations by obtaining the values for the expressions contained in these operations and performing the relations expressed therein on the retrieved values. Those skilled in the art should understand that other processing techniques are applicable as well, such as the use of expert systems, neural networks, case-logic systems, natural language processing system or other logic processing and outcome determination techniques.

In addition, filter and rule operations may include calls to functions, routines, procedures, or entire computer programs which produces results (e.g., output) that the rule engine 315 may use to evaluate a rule or filter operation. In other words, a rule might contain a call to a computer program (e.g., within a conditional rule operation) or other function or routine that the resource server computer system 200 (or another computer system) can perform when evaluating that filter or rule operation and that can return an output that can be used to determine the final outcome of the rule or filter operation containing the call to the program, function or the like. The point is that while preferred embodiments of the invention may evaluate filter and rule operations using language or query processing and evaluation techniques such as an SQL rule engine, this invention is not limited in this manner and rules might contain calls to external processes which can return values that are used in the evaluation of rules.

Also as illustrated in the above example of Rule 1, the relations "USES" and "IS A MEMBER OF" define relation functions or conditions that accept parameters and that can return a true or false result. More specifically, the "USES" relation defines a conditional function that, when processed by rule engine 315, can determine if the payroll management software application uses the resource. If this condition is true, then the "USES" relation returns a true or positive result. Likewise, the "IS A MEMBER OF" relation defines a function that can determine if the requestor is in a particular group (in this example). If these conditions in these relations are met, then the filter operation is satisfied and the rule operations defined in Rule 1 will be used (processed by the rule engine 315) in making an access control determination.

Within rule 1, rule operations 1.1 and 1.2 grant permissions to the requestor. Rule operation 1.1 is conditioned on an "IS" relation that defines a relation function that determines if the requestor has a specific role identity of "CEO". Recall that the login agent 305 can determine and/or assign a requestor or role identity at login. If the "IS" relation is true as tested against the value of the role identity of the requestor, the rule engine 315 applies rule operation 1.1 to set the access control permission of the requestor (the CEO in this example) to "modify". This allows the CEO to modify payroll data. If the "IS" relation condition in rule operation 1.1 were not true (the requestor is not the CEO), then the rule engine would continue on to process rule operation 1.2 to only grant read permission to the requestor.

The final rule operation 1.3 in rule 1 is a disregard instruction. This is a unique aspect of this invention which allows rule processing to be further limited upon the occurrence of a disregard instruction in a rule operation. That is, generally, a disregard instruction, when processed by the rule engine 315, can causes the rule engine 315 to either completely halt rule processing and return the permissions set thus far granted in the form of an access control decision 302-1 or query results 302-2 to the requestor 120 through 124 providing the access request 301, or a disregard instruction can limit performance of any as-of-yet unperformed rules or rule operations that remain to be processed by the rule engine 315 in the selected set of rules 318. If no disregard instruction is present or processed (via rule engine 315) in a rule operation in a rule, and the rule engine 315 selects multiple rules via their filter operations to be applied in a given access control scenario (i.e., in response to receiving an access request 301), then the next set of rule operations from the next rule will be applied by the rule engine 315. That is, rule processing continues for all rules selected via filter operations until a rule operation in one of the rules is performed and contains a disregard instruction that limits future rule processing (or stops it), or until there are no more applicable rule operations to be processed.

In this example, the disregard rule operation 1.3 specifies disregard criteria of "ALL RULES RELATED TO PAYROLL_DATA." Such disregard criteria establishes a condition to be met during rule processing in order for this disregard instruction to be applied. In other words, assume for this example that the rule engine 315 placed rules 1 and 3 were in the selected set of rules based on filter processing. As such, when the rule engine 315 performs the disregard instruction in rule operation 1.3, the rule engine 315 can continue rule processing but the rule engine 315 thereafter will disregard any rules that relate to payroll data. In the example rule set in FIG. 5, it turns out that all other rules have some relation to payroll data. In this example then, the rule engine 315 would not perform rule processing on rule 3 after performing the disregard instruction in the rule operation 1.3 since this disregard instruction instructs the rule engine 315 to ignore or not process any other remaining rules in the selected set of rules 318 (FIG. 3) that relate to payroll data (rule 3 in this example). The disregard instruction (e.g., rule operation 1.3) thus allows a creator of a rule set to be sure and allow or have granted (via rule engine processing) only those permissions that should be given out in a particular situation.

While not shown in this example, it is to be understood that a disregard instruction can be proceeded by or followed by a relation or condition (in addition to specifying disregard criteria), such as "IF REQUESTOR IS CEO THEN DISREGARD . . . " Such a rule operation allows a drafter (e.g., access control administrator) of the rule set to further customize how the access control policy embodied by the rules is carried out. Note that a disregard instruction that specifies no disregard criteria will cause rule processing to stop completely, without allowing the rule engine 315 to perform any remaining rule or rule operations in the selected set of rules.

The other rules 2, 3 and 4 are essentially self explanatory and may be readily understood by reading their associated filter and rule operations. For instance, rule 2 only applies if the payroll management application access the resource specified in the access request 301 and the requester is a member of the accounting department. If applicable, then the requestor receives "READ" permission. Not that there is no disregard instruction in rule 2 and thus if other rules (e.g., rule 4) were selected during the rule filtering process, their rule operations would be performed after rule operation 2.1. Likewise, rule 4 provides an example of a more complex, yet readily understandable filter operation 4.1. This filter operation 4.1 determines that if the resource (from the access request 301) is payroll data storage (e.g., one of the storage devices 160 that stores payroll data) and the requestor is a member of the systems management department (i.e., defined as a group definition, stored in group database 350-6) and the resource is connected to a backup server (e.g., also be defined as a group of backup servers in database 350-6) and space available (an attribute of the object representing the payroll data storage device) is less than 10 gigabytes, then the rule engine 315 provides the requestor (presumably a systems manager if this filter operation is met) with "FORMAT" "ALLOCATE" "CONNECT" "READ" and "BACKUP" permissions. Such permissions allow the systems manager to format new disks, allocate space to the payroll data storage system and connect the new space to system, as well as to read and backup the payroll data. This example illustrates how the system of the invention allows a security or access control administrator to intuitively described an intended access control policy.

Note that the disregard instruction defined in rule operation 4.2 is conditional on the identity of the requestor being a systems manager. This rule thus grants the aforementioned permissions to systems managers, but ensures that other unnecessary permissions are not granted by halting rule processing via the disregard instruction that contains no disregard criteria. Also note that the permissions granted are more explicit than simple read, write and execute permissions offered by conventional access control mechanisms.

The theory behind such a set of rules as shown in the example rule set 350-4 is that the payroll management application can be used by various requestors (e.g., CEO, systems administrators, payroll administrators, etc.) to access payroll data, which may be quite sensitive to the company owning the data. If the CEO is accessing such data, then the designer/administrator of this particular access control system intends that the CEO should be the only person having the ability to modify the payroll data, while others in the CEO department can read but not modify the payroll data. Also, the CEO should not be able to configure the payroll data in other ways via additional permissions, as this task is best left to those familiar with the payroll management application (i.e., the payroll administrators). The disregard instruction in rule operation 1.3 ensures that all subsequently processed rules that pertain to payroll data will be disregarded and not processed by the rule engine 315. It may also be the case that there are no payroll administrators in the CEO/executive department 124. Rather, these people are in the systems management department 120, and rule 3 may apply to those people (rule 3 allowing the payroll administrators to have all permissions except modify, Monday through Friday 8–6). Accordingly, depending upon the content of the access request, both rules 1 and 3 might relate to accessing payroll data, but in some instances only Rule 1 might apply, while in other instances Rule 3 might apply. As such, the disregard instruction (e.g., Filter operation 1.3 in Rule 1) allows the rule engine 315 to cease providing permissions related to payroll data once rule 1 has been applied, but allows rule processing to continue in other manners (i.e., to allow other rules to grant other permissions not related to payroll data).

It is to be understood that the determination made by the rule engine 315 of whether a rule "relates to" payroll data, as specified in the disregard criteria of rule operation 1.3, can be accomplished by the system of the invention in many different ways. A simple rule attribute table, for example, can be incorporated into the rule engine 315 to specify attributes associated to each rule. Such a table can be established by the security administrator during initial configuration of a rule set. An example of such a rule attribute table is provided below:

TABLE 2

Rule Attribute Table

| RULE | RULE ATTRIBUTES (e.g., Relates to . . . , Grants . . . , Specifies . . . etc.) |
|---|---|
| 1 | A: Relates to payroll_data, payroll_management_application, ceo_department, CEO<br>B: Grants modify |
| 2 | A: Relates to payroll_management_application, payroll_data, accounting_department<br>B: Grants read |
| 3 | A: Relates to payroll_management_application, payroll_data, payroll_storage_admins<br>B: Grants all permissions, no_modify<br>C: Specifies time_table |
| 4 | A: Relates to systems_management_application, payroll_data_storage, systems_management_department, backup_server<br>B: Grants format, allocate, connect, read, backup<br>C: Specifies time_table |

The example rule attribute table shown above associates attributes with specific rules. The attributes in this example are values that "relate to" a rule, and permissions that a rule "Grants" as well as attributes that a rule "specifies." In other words, the table in this example indicates what permissions a rule grants (but not necessarily to whom), what things a rule relates to in some manner, and if a rule specifies a certain criteria, such as a time table of rule applicability for rule 4 in the above example. These attributes can be used to perform conditional tests in the disregard criteria of a disregard instruction. It is to be understood that the example attributes are not meant to be limiting of this embodiment of the invention. Accordingly, many other or fewer attributes can be listed in the table along with associated attribute values.

That is, the rule engine 315 can use these attributes when evaluating disregard instructions or other rule operations to test conditions or evaluate disregard criteria to determine how further rule processing should be limited. For example, as explained above, the disregard instruction in rule operation 1.3 disregards all rule operations that follow rule operation 1.3 in the selected set of rules 318 that relate to payroll data. To make this determination, the rule engine 315 can consult the rule attribute table to see if any other rules in the selected set of rules 318 include an attribute that relates that rule to payroll data. If a rule contains such an attribute and is included in the selected set of rules 318 and has not yet been processed (i.e., is yet to be processed after the disregard instruction in rule operation 1.3), then the rule engine 315 will disregarded during the remainder of rule processing as if that rule does not exist in the selected set of rules 318. Those skilled in the art should understand that other mechanisms for associating attributes to rules can be used, besides including such attributes in a table. For instance, any other data structure can be used, such as a linked list, object data structure, or the like.

Figure 6:
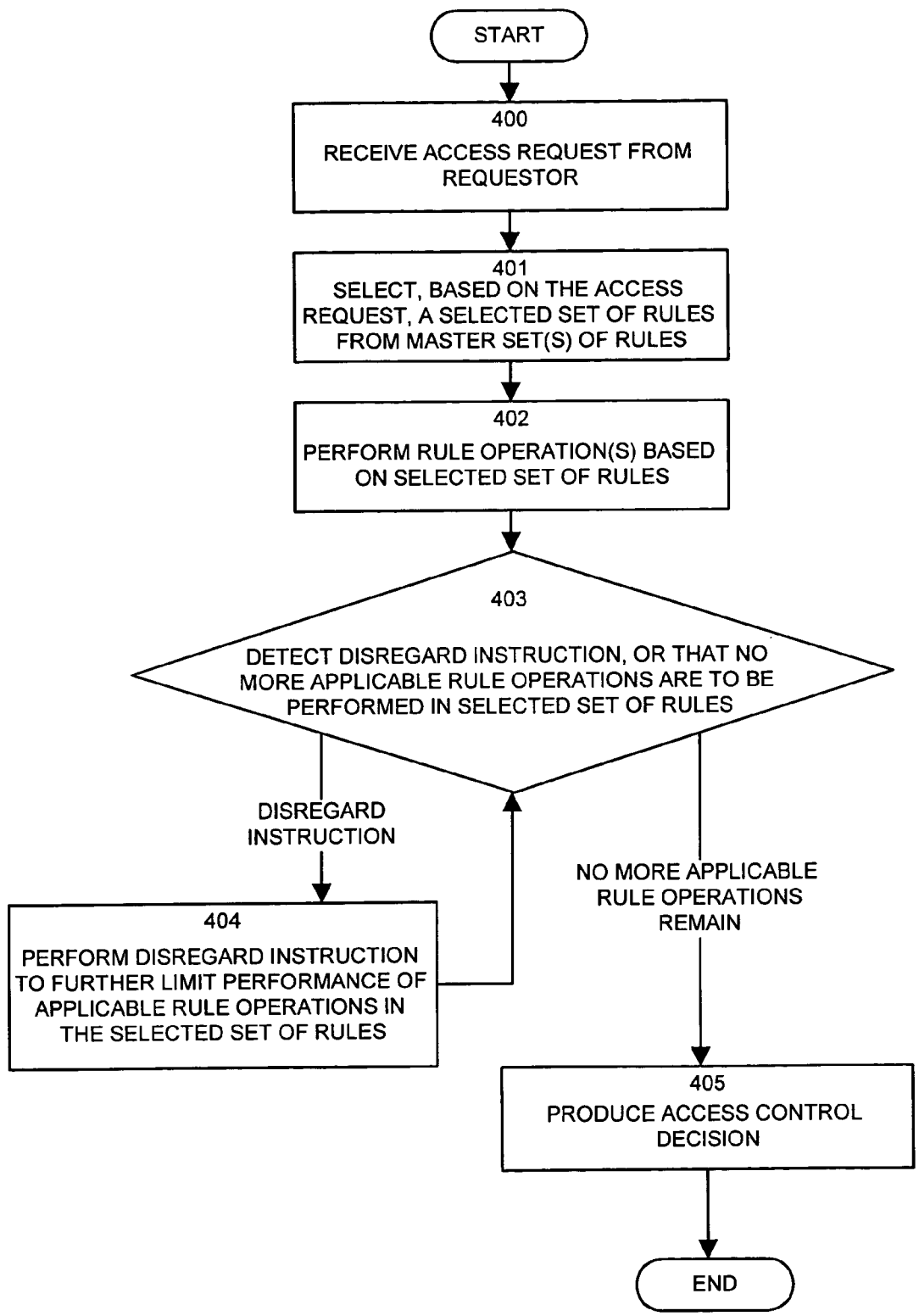
FIG. 6 is a flow chart of general processing steps performed by the role/rule-based access control system configured in accordance an embodiment of the invention.

FIG. 6 shows the processing steps generally performed by the rule engine 315 to produce an access control decision based upon an access request 301. In step 400, the rule engine 315 receives the access request 301 from a requestor 120 through 124 (e.g., via the login agent 305). In step 401, the rule engine 315 selects, based on the information in the access request 301 (i.e., based on one or more of the REQUESTOR, ACCESS, and/or RESOURCE), a selected set of rules 318 (FIG. 3) from the master set of rules. Filter operations associated with each rule as explained above can be used to perform this rule selection process. Next, in step 402, the rule engine 315 performs rule operation processing (e.g., as explained above) on the selected set of rules. As discussed above, the filter operations define selected set of rules that each contain one or more rule operations. Applicable rule operations in the selected set of rules are those rule operations that the rule engine 315 has yet to perform in the selected set of rules 318. As rule engine processing proceeds to process rule operations, the set of applicable rule operations get smaller in size as each rule operation is processed. Rule engine processing in step 402 is repeated until, as indicated in step 403, either the rule engine 315 encounters a rule operation that includes a disregard instruction or until no more applicable rule operations remain for performance in the selected set of rules. That is, upon processing each rule operation in step 402, the rule engine checks the conditions in step 403. Upon the occurrence of either condition in step 403, rule engine processing proceeds to either step 404 (in the case of a disregard instruction) or step 405 (in the event that there are no more applicable rule operations to perform) to complete access control processing.

In step 404, the rule engine 315 performs the disregard instruction to further limit performance of any remaining applicable rule operations in the selected set of rules 318. As previously explained, the disregard instruction in a rule operation can further limit performance of any remaining applicable rule operations in the selected set of rules 318 altogether if the disregard instruction is unconditional and contains no disregard criteria. Alternatively, the disregard instruction may cause the rule engine 315 to mark certain rule operations in the remaining applicable rule operations in the selected set of rules 318 to be disregarded, so that they are non longer being applicable during the remaining rule processing.

An example of an unconditional disregard instruction with no disregard criteria is the disregard instruction in rule operation 3.4 in rule 3 in FIG. 5. Upon performance (i.e., processing or otherwise executing or interpreting) of such a disregard instruction (unconditional with no disregard criteria), in step 404, the rule engine 315 marks or otherwise indicates that all remaining rules and rule operations in the selected set of rules 318 (determined by filter operations in step 401) are to be disregarded, and processing proceeds back to step 402. At this point in processing (in the case of processing an unconditional disregard instruction in step 404 that contains no disregard criteria), there are no more applicable rule operations, or in other words, there are no rule operations remaining to be performed, since the unconditional disregard instruction (in rule operation 3.4) causes the rule engine 315 (in step 404) to mark all remaining rule instructions in the selected set of rules 318 to be disregarded or inapplicable. Thus, after returning to step 402 from step 404, the rule engine 315 proceeds immediately to step 403. In step 403, the condition that no more applicable rule operations are available for performance (since the disregard instruction caused the rule engine, in step 404, to mark all rule and rule operations to be disregarded) is met and so rule engine processing proceeds to step 405 to produce the access control decision.

Returning attention now to step 404, if a disregard instruction contains disregard criteria (e.g., DISREGARD ALL RULES RELATED TO PAYROLL_DATA), then the rule engine 315 applies that disregard criteria to the remaining unprocessed (unperformed, or still applicable) rules and rule operations in the selected set of rules 318. As such, the rule engine 315 marks any remaining applicable rule operations to be disregarded (i.e., marks such rules or rule operations for non-performance). In other words, the rule engine 315 in step 404 marks any rules or rule operations that meet the disregard criteria to be disregarded in any further rule processing. Accordingly, the rule engine 315 will not perform such rules or rule operations marked in this manner when processing proceeds back to step 402 from step 404. Upon returning to step 402, the rule engine 315 continues to perform only those rules or rule operations that are not marked to be disregarded.

In this manner, disregard instructions that include disregard criteria (e.g., Rule operation 1.3) can further limit performance of applicable rules or rule operations by marking some rules or rule operations (or possibly all, if all remaining rules or rule operations happened to each meet the disregard criteria) to be disregarded from further performance, while leaving other rules or rule operations unaffected. When a disregard instruction containing disregard criteria is completed in step 404, the rule engine 315 return processing to step 402 to complete processing of any remaining rule operations (i.e., those that are not marked to be disregarded) in the selected set or rules 318.

It should be understood that the processing of step 404 (disregard instruction processing) may happen multiple times when the rule engine 315 processes a selected set of rules. That is, a rule might contain a rule operation with a disregard instruction that includes disregard criteria that applies to eliminate (i.e., further limit) some rules or rule operations in the remaining unprocessed selected set of rules 318, and upon processing the remaining applicable selected set of rules 318, the rule engine 315 may encounter another disregard instruction which can further limit processing in the manners as explained above.

When all applicable rules and rule operations in the selected set of rules are complete, processing proceeds to step 405. In step 405, the access control decision 302-1 is complete and consists of the various permission(s) granted to the requestor as determined by what rule operations were performed in step 402. At this point, the rule engine 315 produces the access control decision from the rule engine 315 and processing is complete. The aforementioned processing operations can be performed for each access request 301 that the authorization system 300 receives.

Using the steps of FIG. 6 as explained above, the authorization system 300 of the invention can select a set of rules 318 that define rule operations using filter operations, and then, using disregard instruction(s), can perform less that all of the rule operations defined in the initially selected set of rules 318. This allows the rule engine 315, for example, to further limit or completely terminate the performance of any remaining rule operations based on the presence of a disregard instruction. This is advantageous in this invention since if filter operations determine that a rule R applies to a resource as much as a rule S does (based on a general filter operation) for a present access control scenario, but rule R is first in the selected set of rules that apply and includes a disregard instruction causing rule S to be marked as disregarded (either via an unconditional disregard instruction, or by disregard criteria that matched rule S), then rule S will have no further effect on the access control decision since the disregard instruction in rule R limits rule processing to rule R only (thus essentially halting rule processing in this example). This may be beneficial for instance where the rule S might not be needed in the current access control scenario, but might be needed at a later time when a slightly different access control request includes values for REQUESTOR, RESOURCE, and/or ACCESS that vary slightly from a current scenario.

It is to be understood that the system of the invention can use rule parsing techniques that are known in the art of natural text or rule processing to determine what relations, conditions or other information is/are present in the filter operations, rules and rule operations. That is, the details of the actual processing required to parse, discover and determine or evaluate the contents of each rule, filter operation and/or rule operation are understood to be well known by those skilled in such areas as natural language processing systems, compiler processing (e.g., to parse programming language statements), database query interpretation (e.g., SQL processing), and the like. As an example, the rule attribute table above can be implemented as a database table listing all rules and their associated attributes. SQL or another database query or filtering language can then be used to acquire the attributes of a particular rule. In a similar manner, such techniques can be used to obtain specific filter and rule operations from within rules that can be maintained in similar database tables. Thus, the actual process of reading the rule set and determining the content or evaluation of the filter and rule operations is not described in detail here. However, the structure of the rules and filter operations, including disregard instructions and disregard criteria and their applicability, meaning and use in the context of access control as explained herein, and their ability to be uniquely and/or hierarchically arranged to govern the determination of access control decisions are unique to this invention.

In an alternative embodiment, if more than one rule is selected by the filter operation(s), a situation may arise in which two or more rules contain disregard instructions that, if performed by the rule engine 315, would cause the other rules to be disregarded. That is, a situation may arise in which two rules in the selected set of rules 318 would eliminate each other from the access control decision based on their disregard instructions. To handles such occurrences, the system of the invention can warn the requestor (or an access control administrator) that two rules conflict with each other.

Alternatively, the rule engine 315 can use the order of the rules in the master set of rules 350-4 to determine which rule is applied first, thus causing a rule appearing later in the rule set (that, if performed, would cause the former rule to be disregarded) to be disregarded. That is, in this alternative embodiment, in the case of dueling rules that would cause each other to be disregarded, then the lower numbered rule could prevail and be performed to completion, thus causing the higher numbered rule to be disregarded.

In another alternative embodiment, higher numbered rules can prevail over lower numbered rules.

In yet another alternative to avoid this issue, each rule could be assigned a priority in the rule attribute table, irrespective of rule numbering. Higher priority rules that contain disregard clauses would cause lower priority rules (that also might contain disregard clauses) to be disregarded.

In yet another alternative embodiment, each rule would be disregarded. In this embodiment, after filter operations in step 401 have produced a selected set of rules 318, the rule engine 315 can first search each rule in the selected set of rules 318 for any conflicting disregard clauses and can eliminate (i.e., mark to be disregarded) any rules that have disregard clauses that apply to each other.

Figure 7:
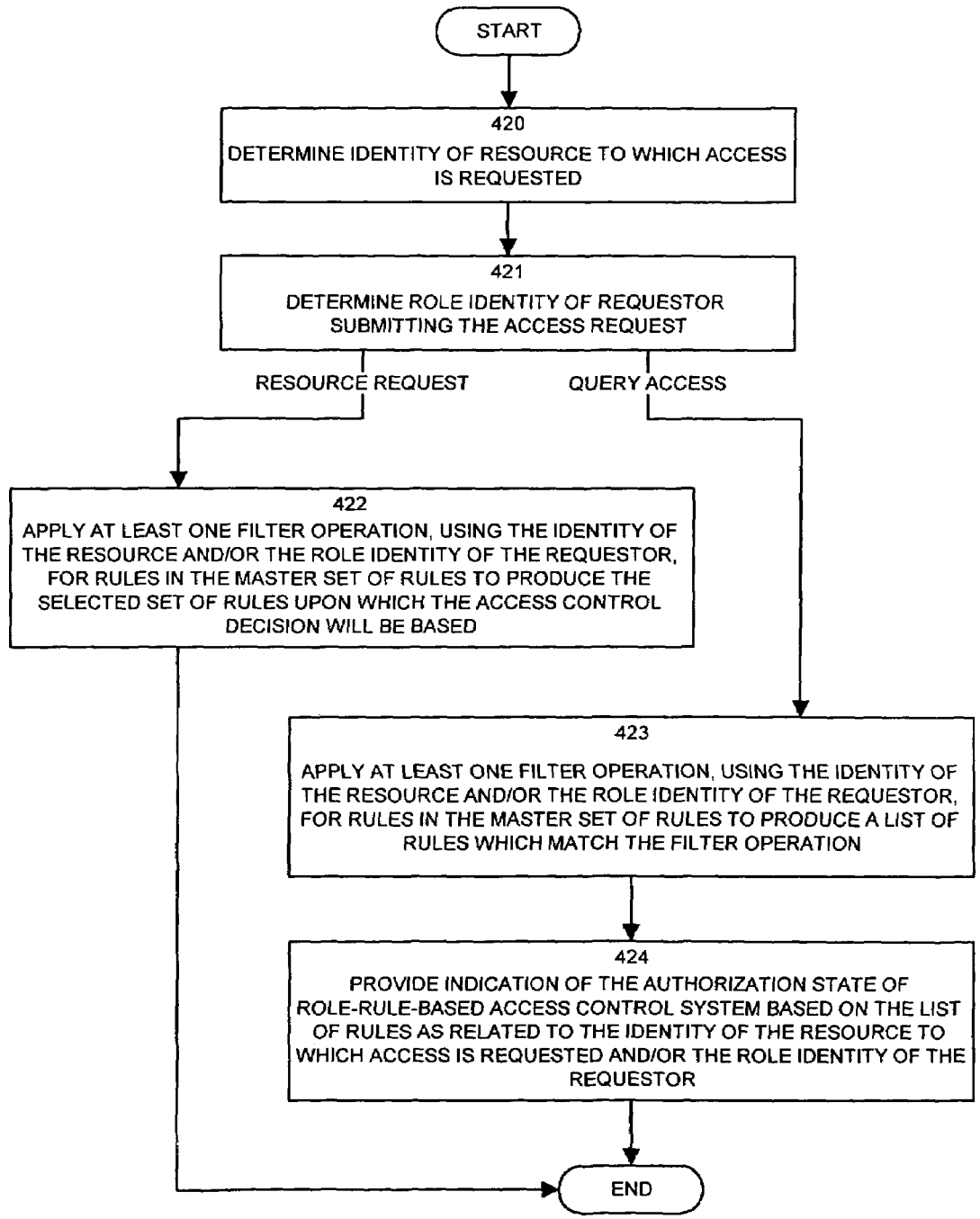
FIG. 7 is a more detailed flow chart of processing steps performed by the role/rule-based access control system configured in accordance an embodiment of the invention.

FIG. 7 illustrates the details of step 401 from FIG. 6 which concern the processing operations performed in an example embodiment of the invention when processing an access request 301 (query or resource) against the master set of rules 350-4 to select which rules will be applied (i.e., selection of the selected set of rules 318) to make an access control decision 301-1 or to produce query results 301-2. To process both resource and query access requests 301-1, 301-2, in step 420, the rule or query engine 315, 320 determines an identity of the resource to which access is requested by the access request 301. Next, in step 421, the rule or query engine 315,320 determines the role identity of the requester submitting the access request.

Generally, for steps 420 and 421, the identity of the resource and the identity of the role requester are equal to the respective values of the RESOURCE and REQUESTOR portions as specified in the access request 301 received in step 400 (FIG. 6). However, the RESOURCE and/or the REQUESTOR information indicated within the access request 301 may specify values indicating a username, a software application, or a specific computer or peripheral device which the rule or query engine 315, 320, in respective steps 420 and 421, can then compare to a resource or role identity table that matches this information to a specific resource or requestor role identity, such as one of the role identities or resource identities in Columns 1 and 2 of Table 1 shown above.

If the access request 301 is a resource access request 301-1, then the rule engine 315 processes step 422 in FIG. 7. In step 422, the rule engine 315 applies at least one filter operation, using the identity of the resource and/or the role identity of the requestor and/or the a type of access being requested, for rules in the master set of rules 350-4 to produce the selected set of rules 318 upon which the access control decision will be based. In other words, the rule engine 315, in step 422, applies filter operations to the access request 301 to determine what rules might apply (i.e., to determine an initial set of applicable rules—the selected set of rules 318) to an access control decision for the access request 301. As noted above, by applying the filter operations (which in the former example are provided as part of the rules themselves), the rule engine 315 can selectively eliminate having to process many of the rules in the master set of access control rules 350-4. This saves processing time and can allow the rule engine 315 to produce an access control decision based on processing rule operations from the selected set of rules in a lessor amount of time.

In step 421, if the access request is a query access request 301-2, then the query engine 320 processes step 423 to apply at least one filter operation, using the identity of the resource and/or the role identity of the requestor and/or the a type of access being requested, for rules in the master set of rules 350-4 to produce a list of rules which match the filter operation. Next, in step 424, the query engine 320 provides an indication of the authorization state of the role-rule-based access control system 300 based on the list of rules as related to the identity of the resource and/or the role identity of the requestor and/or the a type of access being requested. In this manner, a user can query the access control system 300 to determine, for example, what rules in the master set of rules 350-4 might be applied in a particular access control scenario (i.e., based on the values for the REQUESTOR, ACCESS and RESOURCE specified in an access request 301).

In the context of resource and query access requests, generally, rule operations apply if the filter operations determine that the resource, requester or access type requested satisfy filter operations which thereby specify that the rule might be applicable to an access control decision or to produce query results. The system of the invention will thus provide or grant a particular requestor (e.g., a computer user acting in a role identity) certain permissions if there is at least one rule that is applicable as determined by filter operations and if there is a rule operation that grants a permission to that requestor within that rule.

As shown in Table 1 above, the rule and role based system of the invention allows far more precise access control for requestors accessing resource(s) since the system allows an administrator of the access control system 300 to define and create as many or as few rules, permissions and requestor roles as may be required to carry out any necessary access control policy for the particular computing environment (e.g., 100 in FIG. 1). For example, while only a small number of permissions are shown in the example rule set 350-4, other more defined sets of permissions may be created as needed to control fine or course levels or granularities of access control. For instance, an alternative permission set that is different than the examples given above can provide for extremely precise access control and authorization mechanisms for access to data within a data storage system. Such an example alternative permission set is shown in Table 3 below:

TABLE 3

Example of Alternative Permissions

| Permission | Resource to which permission applies | Examples of Permission Meaning |
| --- | --- | --- |
| Read | Anything | Read all management information - state, configuration, group membership, etc. |
| Add | Group | Add members |
| Control | Anything | Do anything to the resource |
| Claim | Anything | Change authorization |
| Change Attributes | Anything | Change the attributes of an object representing a resource; the resource may or may not be directly affected |
| Configure | Data Storage System, Volume, Hub, Switch | Change the operating configuration of the resource; a powerful privilege |
| Create Data Storage Volume | Data Storage System | Create or destroy a Data Storage System Volume; a subset of Configure privilege |
| Swap Volumes | Data Storage System or other device | Exchange two volumes, and do all operations necessary to bring a second volume copy into operation, or to switch back to original configuration. |
| Adjust Monitoring | Anything except groups? | Control what performance data, historical data, and other data about the operation is captured. Does not let one eavesdrop on live application data, such as the contents of a Data Storage System Volume |

As indicated in Table 3 above, the administrator of the access control system of this invention can establish permissions other that simple operating system specific permissions such as read, write and execute. This allows an application developer to create software applications (e.g., 206 in FIG. 2) that provide custom access requests specific to the computing environment in which the application operates and that require the granting of custom permissions (via this invention) in order to fully operate.

For instance, using this invention, rules can, for example, create or grant permissions other than read, write, execute. Such other permissions may be custom defined in the system of the invention. Such custom permissions might be application specific, and application developers that are aware of such rules and custom permissions can create software applications that provide access requests (e.g., via an application programming interface (API), for example) that require the access control system 300 to grant and return an access control decision 302-1 that includes the custom permissions or else access to the resource will be denied to users of the application. In other words, depending upon what rules are created by the rule set developer, virtually any type of permission can be established and granted based on checking relations, conditions, and the like as explained above. The invention thus provides an access control creation environment that allows administrators to develop custom access control schemes or scenarios that might be specific to a particular type of resource that is being policed.

It is also to be understood that the aforementioned embodiments are exemplary in nature and are not meant to be limiting. Many variations are contemplated as being within the scope and spirit of this invention.

For instance, though only one rule set is illustrated in the aforementioned embodiments, alternative configurations can provide different rule sets that are designed to control access to different resources, or that are designed for specific groups (e.g., departments) of requesters. Thus there may be a master set of rules 350-4 for controlling access to data storage devices, and another master set of rules 350-4 for controlling access to computer systems in a specific department.

According to another alternative configuration, there can be a rule set that governs access to resources, and another rule set that is used to simply limit or select rules within a larger rule set. In the later case, the rules themselves can be treated as the resource being accessed, and thus permissions returned are a list of rules that can be accessed for further rule processing.

In another configuration, if the rule engine 315 performs a filter operation that indicates that a rule associated with the filter operation is to be included in the selected set of rules 318, then the rule operation(s) in that rule are performed immediately. In this configuration, each filter operation is thus performed and if the rule for that filter applies, then the rule is then performed before further performance of other filter operations.

While the example explanations of preferred embodiments presented herein relate to access control for data (e.g., files, databases, volumes, directories, filesystems, etc.) stored in a data storage system resource (e.g., 160), it is to be understood by those skilled in the art that the access control mechanisms and techniques of this invention are applicable for providing access control for many other types of resources. For example, a resource might be an entire network, network device (e.g., hub, switch, router, gateway, firewall, proxy server, etc.), computer system or a peripheral device (e.g., printer) or group of devices (e.g., tapes, disks) within a computer system or on a network. In other cases, a resource to which the system of the invention can provide access control might also be an individual filesystem, volume, partition, directory, database, file, or other entity "served" by one or more computers or storage systems. The point is that the access control mechanisms of this invention can be applied to many different access control scenarios and are not limited to controlling access to data storage resources as explained in these examples.

Those skilled in the art will understand that there can be many variations made to the operations of the access control system explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method for providing access control in a computing system environment, the method comprising the steps of:
   receiving an access request;
   selecting, based on the access request, a set of rules containing at least one rule from a master set of rules; and
   producing an access control decision based on performing rule operations in a given rule of the selected set of rules by sequentially performing rule operations in the given rule until performing a disregard instruction, the disregard instruction including disregard criteria identifying a type of other rule operations in the selected set of rules to disregard from performing; and
   after performing the disregard instruction in the given rule:
      i) evaluating the disregard criteria against any remaining unperformed rule operations in other rules of the selected set of rules, the other rules being rules other than the given rule;
      ii) marking any remaining unperformed rule operations in the other rules of the selected set of rules that match the disregard criteria to be disregarded from further rule processing; and
      iii) executing remaining unmarked rule operations in the other rules in the selected set of rules;
   wherein the step of selecting includes the steps of:
      determining an identity of a resource in the computing system environment to which access is requested in the access request; and
      applying at least one filter operation, using the identity of the resource, for rules in the at least one master set of rules to produce the selected set of rules for use in determining the access control decision to the resource; and
   wherein the method further includes the step of determining a role identity of a requestor submitting the access request; and
   wherein the step of performing includes sequentially processing each rule operation in the selected set of rules using the role identity of the requestor submitting the access request in combination with the identity of the resource to determine if the requestor using the role identity can access the resource.

2. The method of claim 1 wherein the selected set of rules is arranged hierarchically such that rules containing rule operations that are more specific are performed before rule operations that are more general.

3. The method of claim 1 wherein:
   the selected set of rules is arranged hierarchically such that rules containing rule operations that are more specific are performed before rules containing rule operations that are more general such that placement of the disregard instruction in one of the rules in the selected set of rules causes the step of performing to control an amount of access control provided to a requester that submitted the access request for access to a respective resource.

4. The method of claim 1 wherein the disregard instruction is a conditional instruction that has a condition that must be met before the disregard instruction is performed.

5. The method of claim 1 wherein:
   at least one rule in the selected set of rules contains a relation that defines a condition based on a group definition; and
   wherein at least one of the steps of selecting and performing includes the step of:
   performing the relation to determine if at least one of a requestor, an access, and a resource specified in the access request satisfy the condition based on the group definition.

6. A computer system configured to provide access control, the computer system comprising:
   at least one input/output interface;
   a processor;
   a memory system encoded with an authorization program;
   at least one authorization database;
   an interconnection mechanism coupling the processor, the at least one input/output interface, the memory system, and the at least one authorization database;
   based at least in part on the processor executing the authorization program, the processor supporting steps of:
   receiving an access request;
   selecting, based on the access request, a set of rules containing at least one rule from a master set of rules;
   producing an access control decision based on performing rule operations in a given rule of the selected set of rules by sequentially performing rule operations in the given rule until performing a disregard instruction, the disregard instruction including disregard criteria identifying a type of other rule operations in the selected set of rules to disregard from performing; and
   after performing the disregard instruction in the given rule:
      i) evaluating the disregard criteria against any remaining unperformed rule operations in other rules of the selected set of rules, the other rules being rules other than the given rule;
      ii) marking any remaining unperformed rule operations in the other rules of the selected set of rules that match the disregard criteria to be disregarded from further rule processing; and
      iii) executing remaining unmarked rule operations in the other rules in the selected set of rules.

7. The computer system of claim 6 wherein the selected set of rules is arranged hierarchically such that when the processor performs the authorization program, rules containing rule operations that are more specific are performed before rule operations that are more general.

8. The computer system of claim 6 wherein when the processor performs the authorization program to select a selected set of rules, the processor:
   determines an identity of an resource to which access is requested in the access request; and
   applies at least one filter operation, using the identity of the resource, for rules in the at least one master set of rules to produce the selected set of rules for use in determining the access control decision to the resource; and
   wherein when the processor performs the authorization program, the processor determines a role identity of a requestor submitting the access request; and
   wherein the processor sequentially processes each rule operation in the selected set of rules using the role identity of the requestor submitting the access request in combination with the identity of the resource to determine if the requestor using the role identity can access the resource.

9. The computer system of claim 8 wherein the disregard instruction is a conditional instruction that has a condition that must be met during processing by the processor before the disregard instruction is performed.

10. The computer system of claim 6 wherein:
the selected set of rules is arranged hierarchically such that rules containing rule operations that are more specific are performed by the processor before rules containing rule operations that are more general such that placement of the disregard instruction in one of the at least one rules in the selected set of rules causes the authorization program, when performed on the processor, to control an amount of access control provided to the requestor that submitted the access request for access to the resource.

11. The computer system of claim 6 wherein:
at least one rule in the selected set of rules contains a relation that defines a condition based on a group definition; and
wherein when the processor performs at least one of the operations of selecting and performing, the processor performing the relation to determine if at least one of a requestor, an access, and a resource specified in the access request satisfy the condition based on the group definition.

12. A method for providing access control in a computing system environment, the method comprising the steps of:
receiving an access request;
selecting, based on the access request, a set of rules containing multiple rules from at least one master set of rules, at least one of the multiple rules including multiple rule operations to be performed in sequential order;
for a first rule of the multiple rules:
performing a filter operation associated with the first rule to identify whether to execute any rule operations in the first rule; and
performing multiple operations in the first rule to determine whether to provide access to a storage system in response to receiving the access request, the first rule including a disregard instruction that, when executed, limits performance to fewer than all rule operations in a second rule of the selected set of rules as specified by disregard criteria in the disregard instruction;
wherein the disregard instruction is a conditional disregard instruction, which limits a performance of other rule operations in multiple rules other than the first rule in the selected set of rules depending on occurrence of a corresponding condition as specified by the disregard criteria in the disregard instruction, the method further comprising:
performing at least one other rule operation in the first rule as well as other rules in the selected set of rules after performing the conditional disregard instruction.

13. A method as in claim 12, wherein the filter operation is an IF-THEN operation and performance of the IF-THEN operation provides an indication whether to perform rule operations in the first rule.

14. A method as in claim 13, wherein performance of the IF-THEN operation includes identifying whether an application generating the access request uses a particular resource in the storage system as well as whether a requestor associated with the access request is a member of a particular specified group and, if so, performing the rule operations in the first rule.

15. A method for providing access control in a computing system environment, the method comprising:
receiving an access request;
in response to receiving the access request, selecting a set of rules for processing to determine whether to permit the access request;
during processing of the set of rules, performing a conditional disregard rule operation in the set of rules;
based on performing the conditional disregard rule operation, disregarding execution of at least one rule operation other than the conditional disregard rule operation in the set of rules as specified by the conditional disregard rule operation; and
after performing the conditional disregard rule operation, performing at least one other rule operation in the set of rules not specified by disregard criteria in the conditional disregard rule operation;
wherein a field of data in the conditional disregard rule operation specifically identifies a first type of rule operations that are to be disregarded from execution in the set of rules, execution of the conditional disregard rule operation not having any affect on whether to perform a second type of rule operations in the set of rules.

16. A method as in claim 15 further comprising:
comparing disregard criteria in the field of data associated with the conditional disregard rule operation to data in other rule operations to identify which other rule operations in the selected set of rules to disregard from performance.

17. A method as in claim 15, wherein performing a conditional disregard rule operation further comprises identifying disregard criteria in the conditional disregard rule operation, the method further comprising:
upon performing the conditional disregard rule operation, marking any remaining unperformed rule operations in the set of rules as identified by the disregard criteria; and
continuing performance of rule operations in the set of rules that are not marked to be disregarded.

18. A method as in claim 15 further comprising:
during processing of the set of rules, performing an unconditional disregard rule operation in the set of rules that results in termination of performing any other rule operations in the selected set of rules.

19. A method for providing access control in a computing system environment, the method comprising:
receiving an access request;
in response to receiving the access request, selecting a first set of rules and a second set of rules for processing to determine whether to permit the access request, the first set of rules and the second set of rules each including multiple rule operations;
during processing of the first set of rules, performing a disregard rule operation in the first set of rules; and
based on performing the disregard rule operation, disregarding execution of at least one rule operation in the second set of rules as identified by the disregard rule operation;
after disregarding execution of at least one rule operation in the second set of rules as identified by the disregard rule operation in the first set of rules, performing at least one rule operation in the second set of rules not associated with the disregard rule operation; and following completion of executing the first set of rules and the second set of rules, generating an access control decision whether to permit the access request.

20. A method as in claim 19, wherein selecting the first set of rules and the second set of rules includes applying a respective first filter and a second filter to identify whether to select the first set of rules and the second set of rules for execution.

21. A method as in claim 19, wherein the disregard rule operation is a conditional disregard rule operation, a field of data in the conditional disregard rule operation specifically identifying a first type of rule operations that are to be disregarded from execution in the first set of rules and the second set of rules, execution of the conditional disregard rule not having any affect on whether to perform a second type of rule operation in the second set of rules.

22. A method as in claim 21, wherein performing a conditional disregard rule operation includes identifying disregard criteria in the conditional disregard rule operation, the method further comprising:
upon performing the conditional disregard rule operation, marking any remaining unperformed rule operations in the first set of rules and the second set of rules as identified by the disregard criteria; and
continuing performance of rule operations in the first set of rules and the second set of rules that are not marked to be disregarded.

23. A method as in claim 21 further comprising:
during processing of the first set of rules, performing an unconditional disregard rule operation that results in termination of performing all other rule operations in the selected first set of rules and the second set of rules.

24. A method for providing access control in a computing system environment, the method comprising:
receiving an access request to access data in the computing system environment;
comparing the access request to a master rule set, each rule in the master rule set including a filter and a corresponding set of rule operations to be performed pending evaluation of the filter condition; and
for each rule containing a filter operation that evaluates to indicate execution of rule operations of that rule, executing the rule operations of that rule;
during execution of rule operations of that rule, executing a first conditional disregard instruction that establishes a first set of pre-conditions that must be met in successive rules in the master rule set in order for those successive rules to be executed after the rule containing the first conditional disregard instruction has been executed; and
executing at least one successive rule in the master rule set for which the access request meets the filters of those successive rules, and for which the first set of pre-conditions established by executing the first conditional disregard instruction are also met.

25. The method of claim 24 wherein executing only the successive rules in the master rule set comprises:
executing a second conditional disregard instruction that establish a second set of pre-conditions that must also be met in addition to the first set of pre-conditions established by the first disregard instruction for any remaining successive rules in the master rule set to be executed.

26. The method of claim 24 wherein pre-conditions established by execution of the conditional disregard instructions indicate a type of data upon which rule operations of successive rules in the master rule set operate that are not to be executed during execution of the successive rules in the master rule set.

27. The method of claim 26 wherein the filter of at least one rule in the master rule set includes a test of whether an application associated with the access request uses a particular resource associated with the request.

28. The method of claim 26 wherein the filter of at least one rule in the master rule set includes a test of whether at least two resources associated with the access request are connected to each other.

29. The method of claim 26 comprising skipping execution of those successive rules in the master rule set for which the access request does not meet the filters of those successive rules, and for which the first and second set of pre-conditions established by executing the first and second disregard instructions are not met.

30. A computer program product having a computer-readable medium including computer program logic encoded thereon that when executed on a computer system provides a method for controlling access to a resource, and wherein when the computer program logic is executed on a processor in the computer system, the computer program logic causes the processor to perform the operations of:
receiving an access request to access data in the computing system environment;
comparing the access request to a master rule set, each rule in the master rule set including a filter and a corresponding set of rule operations to be performed pending evaluation of the filter condition; and
for each rule containing a filter operation that evaluates to indicate execution of rule operations of that rule, executing the rule operations of that rule;
during execution of rule operations of that rule, executing a first conditional disregard instruction that establishes a first set of pre-conditions that must be met in successive rules in the master rule set in order for those successive rules to be executed after the rule containing the first conditional disregard instruction has been executed; and
executing at least one successive rule in the master rule set for which the access request meets the filters of those successive rules, and for which the first set of pre-conditions established by executing the first conditional disregard instruction are also met.

* * * * *